United States Patent
Kawakami et al.

(10) Patent No.: US 10,219,025 B2
(45) Date of Patent: Feb. 26, 2019

(54) VIDEO DISTRIBUTION DEVICE, VIDEO DISTRIBUTION METHOD, AND PROGRAM

(71) Applicant: DWANGO Co., Ltd., Chou-ku, Tokyo (JP)

(72) Inventors: Nobuo Kawakami, Tokyo (JP); Taihei Hosokawa, Tokyo (JP); Kenichi Miyazaki, Tokyo (JP); Shinya Kuroda, Tokyo (JP); Takashi Kojima, Tokyo (JP)

(73) Assignee: DWANGO CO., LTD., Chuo-Ku, Tokyo (JP)

( * ) Notice: Subject to any disclaimer, the term of this patent is extended or adjusted under 35 U.S.C. 154(b) by 37 days.

(21) Appl. No.: 15/125,341

(22) PCT Filed: Mar. 13, 2015

(86) PCT No.: PCT/JP2015/057494
§ 371 (c)(1),
(2) Date: Sep. 12, 2016

(87) PCT Pub. No.: WO2015/141581
PCT Pub. Date: Sep. 24, 2015

(65) Prior Publication Data
US 2017/0078731 A1 Mar. 16, 2017

(30) Foreign Application Priority Data
Mar. 18, 2014 (JP) .................. 2014-055610

(51) Int. Cl.
*H04N 21/414* (2011.01)
*H04N 21/431* (2011.01)
(Continued)

(52) U.S. Cl.
CPC ... *H04N 21/4312* (2013.01); *H04N 21/41407* (2013.01); *H04N 21/431* (2013.01);
(Continued)

(58) Field of Classification Search
None
See application file for complete search history.

(56) References Cited

U.S. PATENT DOCUMENTS

| 7,206,029 B2* | 4/2007 | Cohen-Solal | H04N 5/45 345/629 |
| 7,391,423 B1* | 6/2008 | Manzari | G06T 3/4092 345/619 |

(Continued)

FOREIGN PATENT DOCUMENTS

| JP | 2003046987 A | 2/2003 |
| JP | 2003179904 A | 6/2003 |

(Continued)

OTHER PUBLICATIONS

International Search Report corresponding to Application No. PCT/JP2015/057494; dated Apr. 21, 2015, with English translation.

(Continued)

*Primary Examiner* — Jonathan V Lewis
(74) *Attorney, Agent, or Firm* — Cantor Colburn LLP

(57) ABSTRACT

A transmission range determination unit of a video distribution device receives information about a display position for a video gallery display screen from a terminal device and determines, according to the received information, a transmission range for video gallery data in which display images of video data items are arranged, to be a size greater than a possible display range of the terminal device. A video gallery display screen generation unit generates the video gallery display screen in which the display images of the video data items included in the transmission range determined by the transmission range determination unit are arranged according to an arrangement of the display images of the video data items which is defined by the video gallery data, wherein the video gallery display screen generation (Continued)

unit distributes the generated video gallery display screen to the terminal device.

15 Claims, 17 Drawing Sheets

(51) Int. Cl.
  *H04N 21/44* (2011.01)
  *H04N 21/472* (2011.01)
  *H04N 21/482* (2011.01)
  *H04N 21/8549* (2011.01)

(52) U.S. Cl.
  CPC ..... *H04N 21/44008* (2013.01); *H04N 21/472* (2013.01); *H04N 21/482* (2013.01); *H04N 21/8549* (2013.01)

(56) References Cited

U.S. PATENT DOCUMENTS

| | | | | |
|---|---|---|---|---|
| 7,565,036 | B2* | 7/2009 | Marriott | G11B 27/10 382/305 |
| 7,830,459 | B2* | 11/2010 | Nadarajah | H04N 5/45 348/732 |
| 7,849,478 | B2* | 12/2010 | Aratani | H04N 1/00424 715/744 |
| 7,929,056 | B2* | 4/2011 | Tang | H04N 5/44591 348/556 |
| 8,051,450 | B2* | 11/2011 | Robarts | H04N 5/44543 386/296 |
| 8,316,394 | B2* | 11/2012 | Yates | H04N 5/44543 725/39 |
| 8,321,401 | B2* | 11/2012 | Edwards | G06F 17/30817 707/709 |
| 8,397,258 | B2* | 3/2013 | Kim | H04N 5/44591 725/39 |
| 8,402,488 | B2* | 3/2013 | Craner | H04N 5/44543 725/45 |
| 8,416,332 | B2* | 4/2013 | Sato | G06T 11/60 348/333.05 |
| 8,789,126 | B1* | 7/2014 | Nijim | H04N 21/4126 725/109 |
| 8,875,183 | B2* | 10/2014 | Collet | H04N 5/44543 725/41 |
| 9,083,916 | B2* | 7/2015 | Castellan | H04N 5/44543 |
| 9,326,035 | B1* | 4/2016 | Thompson | H04N 21/482 |
| 2003/0120794 | A1 | 6/2003 | Futenma et al. | |
| 2004/0045026 | A1* | 3/2004 | Baril | H04N 5/45 725/59 |
| 2008/0174597 | A1 | 7/2008 | Takagi | |
| 2012/0045188 | A1* | 2/2012 | Sasaki | G06F 3/0482 386/230 |
| 2013/0031206 | A1* | 1/2013 | Miyazaki | H04N 21/41407 709/217 |
| 2013/0036438 | A1* | 2/2013 | Kutaragi | H04N 21/2743 725/38 |
| 2014/0153828 | A1* | 6/2014 | Keszler | G06T 3/4038 382/173 |
| 2014/0223370 | A1* | 8/2014 | Matsuo | G06F 3/0488 715/810 |
| 2014/0250481 | A1* | 9/2014 | Dewa | H04H 20/18 725/115 |
| 2015/0026646 | A1* | 1/2015 | Ahn | G06K 9/00201 715/863 |
| 2015/0181279 | A1* | 6/2015 | March | H04N 21/42607 725/131 |
| 2015/0237390 | A1* | 8/2015 | Watters | H04N 21/4314 725/44 |

FOREIGN PATENT DOCUMENTS

| | | |
|---|---|---|
| JP | 2005301702 A | 10/2005 |
| JP | 2006186867 A | 7/2006 |
| JP | 2007311892 A | 11/2007 |
| JP | 2008176658 A | 7/2008 |
| JP | 2011103522 | 5/2011 |
| JP | 2012186834 A | 9/2012 |
| JP | 2013030899 A | 2/2013 |
| WO | 2011126134 A1 | 10/2011 |

OTHER PUBLICATIONS

Japanese Notice of Reasons for Rejection corresponding to Application No. 2014-055610; dated Mar. 10, 2015, with English translation.

Written Opinion of the International Searching Authority corresponding to Application No. PCT/JP2015/057494; dated Apr. 21, 2015.

* cited by examiner

VIDEO DISTRIBUTION DEVICE, VIDEO DISTRIBUTION METHOD, AND PROGRAM

CROSS REFERENCE TO RELATED APPLICATIONS

This is the U.S. national stage of application No. PCT/JP2015/057494 filed on Mar. 13, 2015. Priority under 35 U.S.C. § 119(a) and 35 U.S.C. § 365(b) is claimed from Japanese Application No. 2014-055610, filed Mar. 18, 2014, the disclosure of which is also incorporated herein by reference.

BACKGROUND ART

In recent years, according to the spread of the Internet and the progress of the broadband for access lines, a technique to distribute a recorded video via the Internet has been watched with interest. For example, in a technique disclosed in Patent Document 1, a plurality of cameras are arranged to prepare distribution of a plurality of videos, so that a user can select a desired video. In this technique, the user can receive the selected and distributed video.

PRIOR ART DOCUMENT

Patent Document

Patent Document 1: Japanese Unexamined Patent Application, First Publication No. 2011-103522.

DISCLOSURE OF INVENTION

Problem to be Solved by the Invention

Conventionally, the user selects and watches a video that interests the user while looking at reduced display items (thumbnails) or titles. However, when there are too many options, checking the reduced display items or titles one by one and selecting a video that interests the user or suits the taste of the user is often complicated for the user. In addition, there is a limit to the number of video items displayed simultaneously, and thus the opportunity of selecting videos which are not included within a screen utilized to the relevant selection may be lost.

In light of the above circumstances, an object of the present invention is to provide a video distribution device, a video distribution method, and a program, which can (i) make the user be conscious that there are videos other than those displayed on the current selection screen, (ii) secure a path to the currently displayed selection screen, and (iii) give the user an opportunity to select a greater number of videos.

Means for Solving the Problem

A video distribution device as one mode of the present invention comprises:

a transmission range determination unit that receives information about a display position for a video gallery display screen from a terminal device and determines, according to the received information, a transmission range for video gallery data in which display images of video data items are arranged, to be a size greater than a possible display range of the terminal device; and a video gallery display screen generation unit that generates the video gallery display screen in which the display images of the video data items included in the transmission range determined by the transmission range determination unit are arranged according to an arrangement of the display images of the video data items which is defined by the video gallery data, wherein the video gallery display screen generation unit distributes the generated video gallery display screen to the terminal device.

In the video distribution device as one mode of the present invention, in the video gallery display screen, information which indicates that the display range is movable may be additionally displayed for the display range of the terminal device.

In the video distribution device as one mode of the present invention, among the display images of the video data items in the video gallery display screen, an outermost image included in the display range of the terminal device in the video gallery display screen may be displayed in a manner such that part of the outermost image is cut by an outer periphery of the display range.

In the video distribution device as one mode of the present invention, in the video gallery display screen, the display images of the video data items may have the same size and may be arranged in a vertical direction and a horizontal direction.

In the video distribution device as one mode of the present invention, if the video gallery display screen generation unit has not received a video data item whose display image is to be displayed in the transmission range, the video gallery display screen generation unit may generate the video gallery display screen in which a display image of other content data associated with the relevant video data is arranged instead of the display image thereof.

The video distribution device as one mode of the present invention, may further comprise:

a display position receiving unit that receives, from the terminal device, information utilized to identify video data item whose display image is shown at a predetermined display position; and a sound distribution unit that distributes sound data of the video data item identified by the information received by the display position receiving unit.

The video distribution device as one mode of the present invention, may further comprise:

a display position receiving unit that receives, from the terminal device, information utilized to identify video data item whose display image is shown at a predetermined display position; and a sound distribution unit that superimposes sound data of the video data item identified by the information received by the display position receiving unit on sound data of another video data item whose display image is arranged in a predetermined range measured from the display image of the identified video data item in the video gallery data, where the volume of each sound data item is determined according to the arrangement of the corresponding display image in the video gallery data.

In the video distribution device as one mode of the present invention, the display images of the video data items arranged in the video gallery display screen may be reduced display images or trimmed display images of the video data items.

The video distribution device as one mode of the present invention, may further comprise:

a video display screen generation unit that receives a display request of a video data item from the terminal device and generates a video display screen in which:

the size of the image of the video data item as a display target indicated by the received display request is greater than the size of each display image on the video gallery screen; and information which indicates that another video data item is selectable as the display target is displayed, wherein the video display screen generation unit distributes the generated video display screen to the terminal device.

In the video distribution device as one mode of the present invention, the information which indicates that another video data item is selectable as the display target may be part or the whole of an image of said another video data item.

In the video distribution device as one mode of the present invention, it is possible that in the video display screen, in addition to the image of the video data item as the display target having a size greater than that of each display image in the video gallery display screen, an image of said another video data item which is selectable as the display target is displayed adjacent to the video data item as the display target in a manner such that part of the image of said another video data item is cut by an outer periphery of the video display screen.

In the video distribution device as one mode of the present invention, the video display screen generation unit may change said another video data item, part of which is displayed on the video display screen, at regular time intervals.

In the video distribution device as one mode of the present invention, in the video gallery data, a display image of said another video data item which is selectable as the display target may be arranged adjacent to the image of the video data as the display target.

The video distribution device as one mode of the present invention, may further comprise:

a comment reception unit that receives comment information for the video data item as the display target on the video display screen from the terminal device to which the video display screen generation unit distributes the video display screen; and a comment distribution unit that distributes the comment information, which was received by the comment reception unit for the video data item as the display target on the video display screen, to the terminal device to which the video display screen generation unit distributes the video display screen.

In the video distribution device as one mode of the present invention, in the video display screen, said information which indicates that another video data item is selectable as the display target may be displayed on left and right sides or upper and lower sides of the image of the video data item as the display target.

A video distribution method, as one mode of the present invention, executed by a video distribution device comprises:

a transmission range determination step that receives information about a display position for a video gallery display screen from a terminal device and determines, according to the received information, a transmission range for video gallery data, in which display images of video data items are arranged, to be a size greater than a possible display range of the terminal device; and a video gallery display screen generation step that generates the video gallery display screen, in which the display images of the video data items included in the transmission range determined by the transmission range determination step are arranged according to an arrangement of the display images of the video data items which is defined by the video gallery data, wherein the video gallery display screen generation unit distributes the generated video gallery display screen to the terminal device.

A program as one mode of the present invention makes a computer function as the units of the above-described video distribution device.

Effect of the Invention

The present invention can make the user be conscious that there are videos other than those displayed on the current selection screen, secure a path to the currently displayed selection screen, and give the user an opportunity to select a greater number of videos.

MODE FOR CARRYING OUT THE INVENTION

Below, an embodiment of the present invention will be explained with reference to the drawings.

Figure 1:
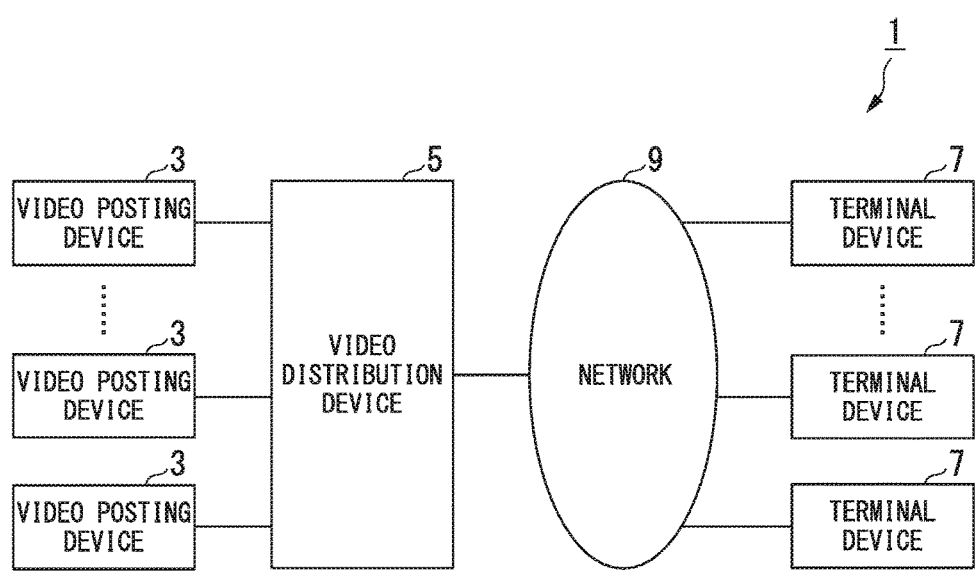
FIG. 1 is a block diagram showing the configuration of a video distribution system according to an embodiment of the present invention.

FIG. 1 is a block diagram showing a configuration of a video distribution system 1 according to the present embodiment. As shown in FIG. 1, the video distribution system 1 has video posting devices 3, a video distribution device 5, and terminal devices 7. The video distribution device 5 is connected to the terminal devices 7 via a network 9 such as the Internet. In addition, the distribution device 5 may be connected to part or all of the video posting devices 3 via the network 9.

Each video posting device 3 may be a smartphone, a tablet terminal, a computer terminal such as a personal computer, each of which has a camera, or a camera to which a communication device is connected.

Figure 2:
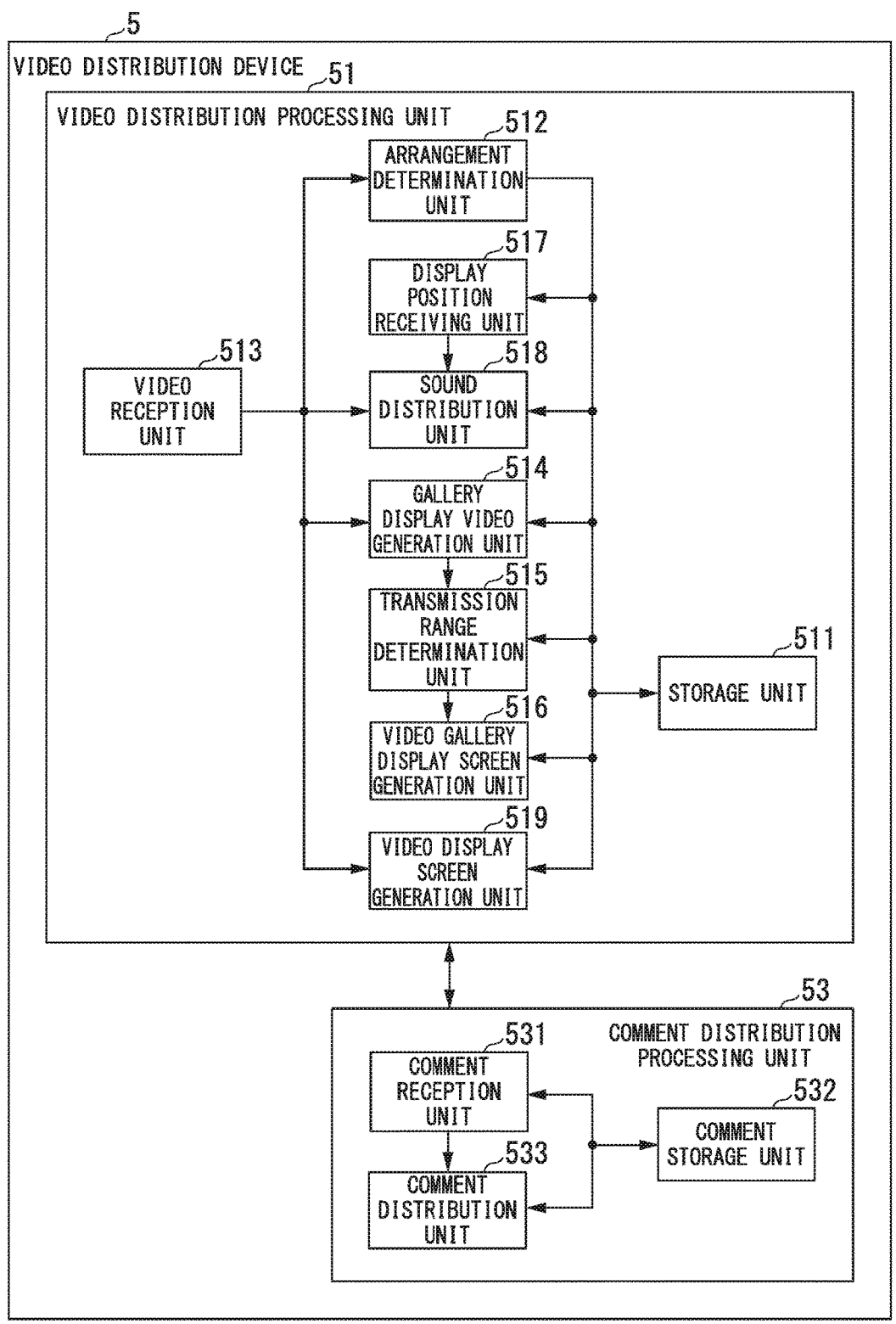
FIG. 2 is a block diagram that shows the internal structure of a video distribution device in the embodiment.

FIG. 2 is a functional block diagram that shows an internal structure of the video distribution device 5, where only functional blocks pertaining to the present embodiment are extracted to be shown. The video distribution device 5 may be implemented by one or more server computers and includes a video distribution processing unit 51 and a comment distribution processing unit 53.

The video distribution processing unit 51 has a storage unit 511, an arrangement determination unit 512, a video reception unit 513, a gallery display video generation unit 514, a transmission range determination unit 515, a video gallery display screen generation unit 516, a display position receiving unit 517, a sound distribution unit 518, and a video display screen generation unit 519.

The storage unit 511 stores various data such as video gallery data. The video gallery data is data which indicates the arrangement of video data when display images which indicate video data items are shown in a gallery form in which they are connected together and spread on a plane. The arrangement determination unit 512 determines the arrangement of the individual video data when the display images of the video data items are shown in the gallery form. The arrangement determination unit 512 stores the video gallery data, which indicates the determined arrangement, in the storage unit 511.

The video reception unit 513 receives video data from each video posting device 3. From the video data received by the video reception unit 513, the gallery display video generation unit 514 generates video data whose size matches to a display size on the video gallery display screen. The video gallery display screen is data of a screen whose size is greater than the display size of a display provided by the terminal device 7, where display images of video data items are included in the size of the display of the terminal device 7.

The transmission range determination unit 515 determines a transmission range for the video gallery data to be a size greater than the possible display range of the terminal device 7. When the transmission range determination unit 515 receives information about a display position on the video gallery display screen from the terminal device 7, the transmission range determination unit 515 determines the transmission range according to the received information.

The video gallery display screen generation unit 516 generates a video gallery display screen, in which display images of video data items within the transmission range determined by the transmission range determination unit 515 are arranged according to the arrangement defined by the video gallery data. The video gallery display screen genera-tion unit 516 distributes the generated video gallery display screen to the terminal device 7.

The display position receiving unit 517 receives, from the terminal device 7 that displays the video gallery display screen, information utilized to identify video data whose display image is shown at a predetermined display position. The sound distribution unit 518 distributes sound data of the video data identified by the information received by the display position receiving unit 517.

The video display screen generation unit 519 receives a video data display request from each terminal device 7 and generates a video display screen on which the size of the image of the video data as a display target indicated by the received display request is greater than the size of the display image on the video gallery display screen. The video display screen generation unit 519 distributes the generated video display screen to the terminal device 7. On this video display screen, part of the image of other video data adjacent to the video data as the display target is cut by the outer periphery (i.e., frame) of the screen, that is, part of the image of the other video data is hidden.

The comment distribution processing unit 53 has a comment reception unit 531, a comment storage unit 532, and a comment distribution unit 533.

The comment reception unit 531 receives comment data for the video data as the display target, from the terminal device 7 to which the video display screen generation unit 519 distributes the video display screen. The comment data includes the content of a comment, information utilized to identify the user who posted the comment, comment posting time, and the like. The comment storage unit 532 stores the comment data received by the comment reception unit 531. The comment distribution unit 533 distributes, to the terminal device 7 to which the video display screen generation unit 519 distributes the video display screen, comment information for the video data as the display target of the video display screen. The comment distribution unit 533 generates the comment information according to the comment data stored in the comment storage unit 532. The comment information includes the content of the comment, information (e.g., user name) about the user who posted the comment, the posting time, and the like.

Figure 3:
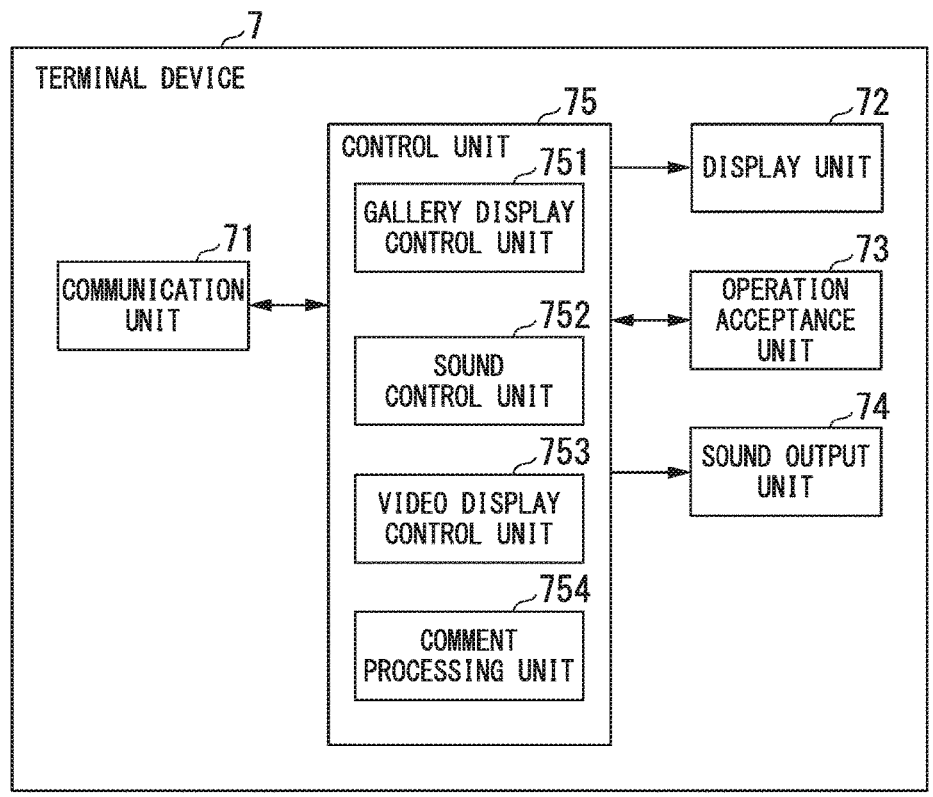
FIG. 3 is a block diagram showing the internal structure of a terminal device in the embodiment.

FIG. 3 is a functional block diagram showing the internal structure of each terminal device 7, where only functional blocks pertaining to the present embodiment are extracted to be shown. The terminal device 7 is implemented by a smartphone, a tablet terminal, a cellular phone, or a computer terminal such as a personal computer. In the present embodiment, the terminal device 7 is a smartphone as an example. The terminal device 7 has a communication unit 71, a display unit 72, an operation acceptance unit 73, a sound output unit 74, and a control unit 75.

The communication unit 71 communicates with the video distribution device 5 via the network 9.

The display unit 72 is a display on which a screen is displayed. The display unit 72 may be a touch panel. The operation acceptance unit 73 accepts various operations of the user. When the display unit 72 is a touch panel, the operation acceptance unit 73 accepts the operations via touch sensors arranged in the touch panel. The sound output unit 74 is a speaker to output reproduced sound of sound data.

The control unit 75 controls the individual units and includes a gallery display control unit 751, a sound control unit 752, a video display control unit 753, and a comment processing unit 754.

The gallery display control unit 751 displays on the display unit 72, a display range on the video gallery display screen whose size is greater than the display size of the display unit 72, where the display range corresponds to the display size of the display unit 72, and the display range is moved according to a display movement operation. Within the display range (displayed by the display unit 72) on the video gallery display screen, the sound control unit 752 receives sound data of the video data, whose display image is displayed at a predetermined position, from the video distribution device 5 and makes the sound output unit 74 output the sound data.

When the operation acceptance unit 73 accepts a display instruction operation to select the video data as the display target by using the display image of the video data on the video gallery display screen displayed by the display unit 72, the video display control unit 753 transmits a display request for the video data selected as the display target to the video distribution device 5.

Additionally, when the video display control unit 753 receives a display target change operation to change the video data, whose part of the image is cut by the outer periphery of the video display screen, to a new display target, the video display control unit 753 transmits a display request for the video data selected as the new display target to the video distribution device 5.

The video display control unit 753 makes the display unit 72 display a video display screen received from the video distribution device 5 in response to the display request.

The comment processing unit 754 transmits comment data, in which the content of the comment input by the user for the video data as the display target on the video display screen is defined, to the video distribution device 5. The comment processing unit 754 also displays the comment information, received from the video distribution device 5, on the video display screen as additional information.

Next, the operation of the video distribution system 1 will be explained. In the following case, the video distribution device 5 performs live distribution of video data, which are received from the video posting devices 3, to the terminal devices 7.

First, an operation performed when the video distribution device 5 receives video data for the live distribution from each video posting devices 3 will be explained.

First, in accordance with a predetermined condition, the arrangement determination unit 512 of the video distribution device 5 determines the arrangement of video data when the display images of the video data items are shown in the gallery form. The arrangement determination unit 512 registers the video gallery data, which indicates the determined arrangement, with the storage unit 511. For example, the video gallery data is information in which each arrangement position in the video gallery corresponds to a video ID of video data, whose display image is displayed at the arrangement position. The predetermined condition may be any information pertaining to the video data. Additionally, the timing of generating the video gallery data is any timing such as at regular intervals, or when an instruction is input.

Figure 4:
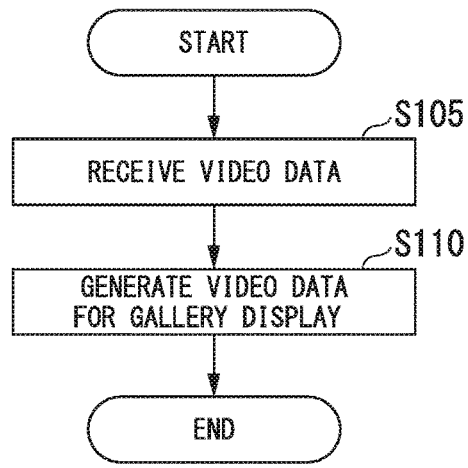
FIG. 4 is a flowchart showing a video receiving operation of the video distribution device in the embodiment.

FIG. 4 is a diagram showing the flow of a video receiving operation in the video distribution device 5.

The video reception unit 513 of the video distribution device 5 receives video data for the live distribution from the video posting device 3 (see FIG. 4, step S105). The gallery display video generation unit 514 generates, from the video data received by the video reception unit 513, video data whose size matches to the display size of the display image on the video gallery display screen (see FIG. 4, step S110).

In the present embodiment, although the display images on the video gallery display screen have the same size, they may have different sizes in accordance with the arrangement positions in the video gallery. The video data suited for the display size of the display image on the video gallery display screen may be video data of a reduced display image or video data whose part of the display image is trimmed.

Next, by using operation flows shown in FIGS. 5 and 6, a video gallery distribution operation in the video distribution system 1 will be explained.

Figure 5:
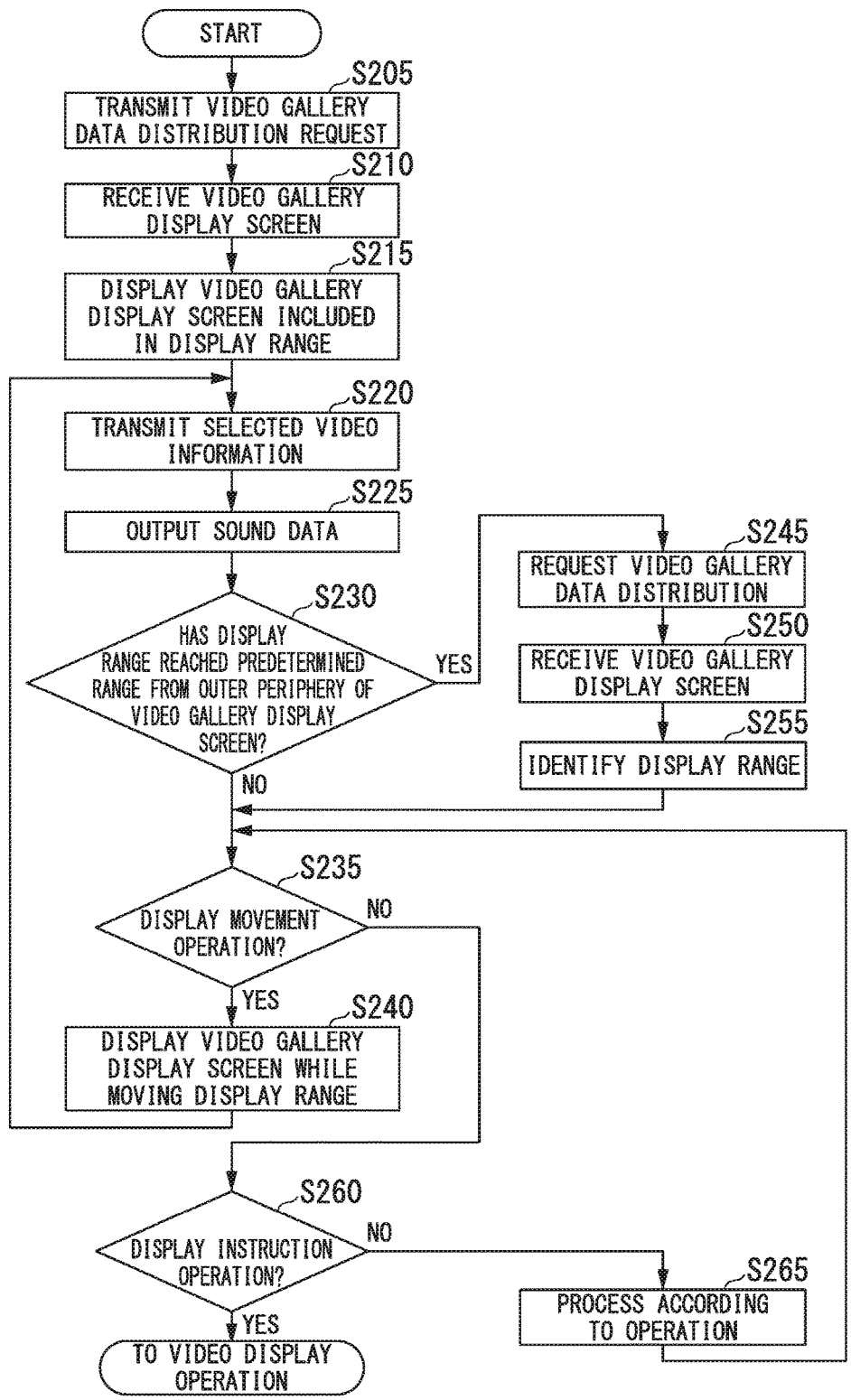
FIG. 5 is a flowchart showing a video gallery display operation of the terminal device in the embodiment.
Figure 6:
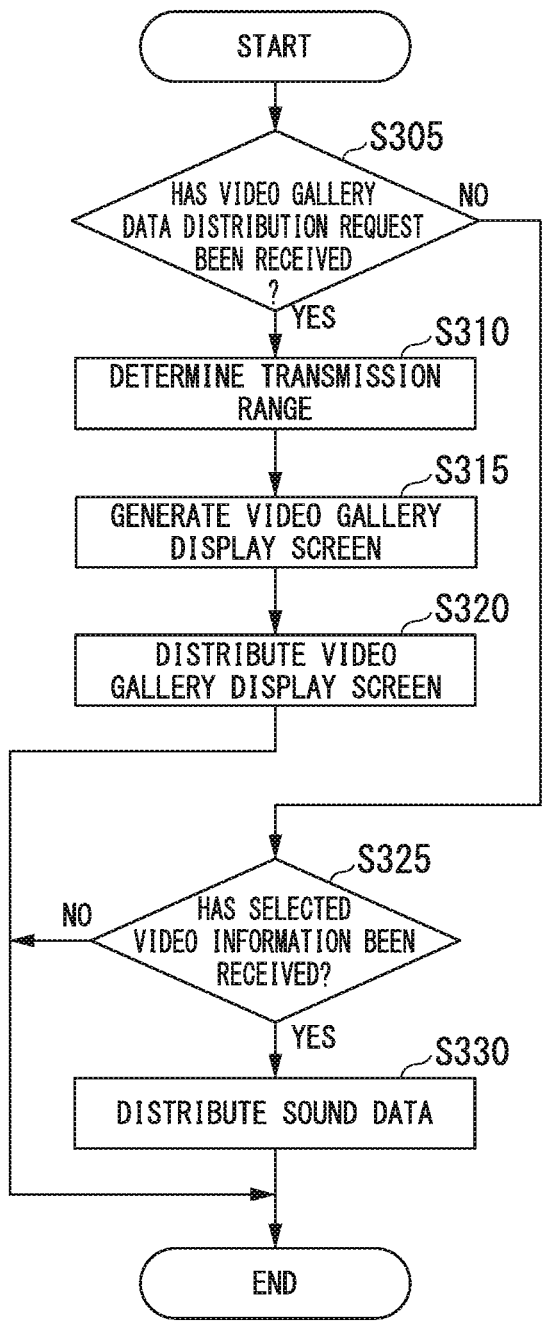
FIG. 6 is a flowchart showing a video gallery distribution operation of the video distribution device in the embodiment.

FIG. 5 is a diagram showing a video gallery display operation flow performed by the terminal device 7 and FIG. 6 is a diagram showing a video gallery distribution operation flow performed by the video distribution device 5.

In FIG. 5, the operation acceptance unit 73 in the terminal device 7 accepts a user operation to request the distribution of the video gallery data. The gallery display control unit 751 transmits a video gallery data distribution request to the video distribution device 5 (see FIG. 5, step S205).

In FIG. 6, the transmission range determination unit 515 of the video distribution device 5 determines whether or not the video gallery data distribution request has been received from the terminal device 7 (see FIG. 6, step S305). Here, the transmission range determination unit 515 determines that the video gallery data distribution request has been received (i.e., "YES" in step S305 in FIG. 6). From the video gallery data distribution request, the transmission range determination unit 515 obtains the display position of the video gallery at the terminal device 7. Since no display position is set in the video gallery data distribution request, the transmission range determination unit 515 sets the display position to a predetermined initial position in the video gallery. The transmission range determination unit 515 retrieves the video gallery data from the storage unit 511, and determines, in accordance with the display position, a rectangular transmission range in the retrieved video gallery data, where the range has a size greater than the possible display range of the terminal device 7 by a predetermined value (see FIG. 6, step S310).

Figure 7:
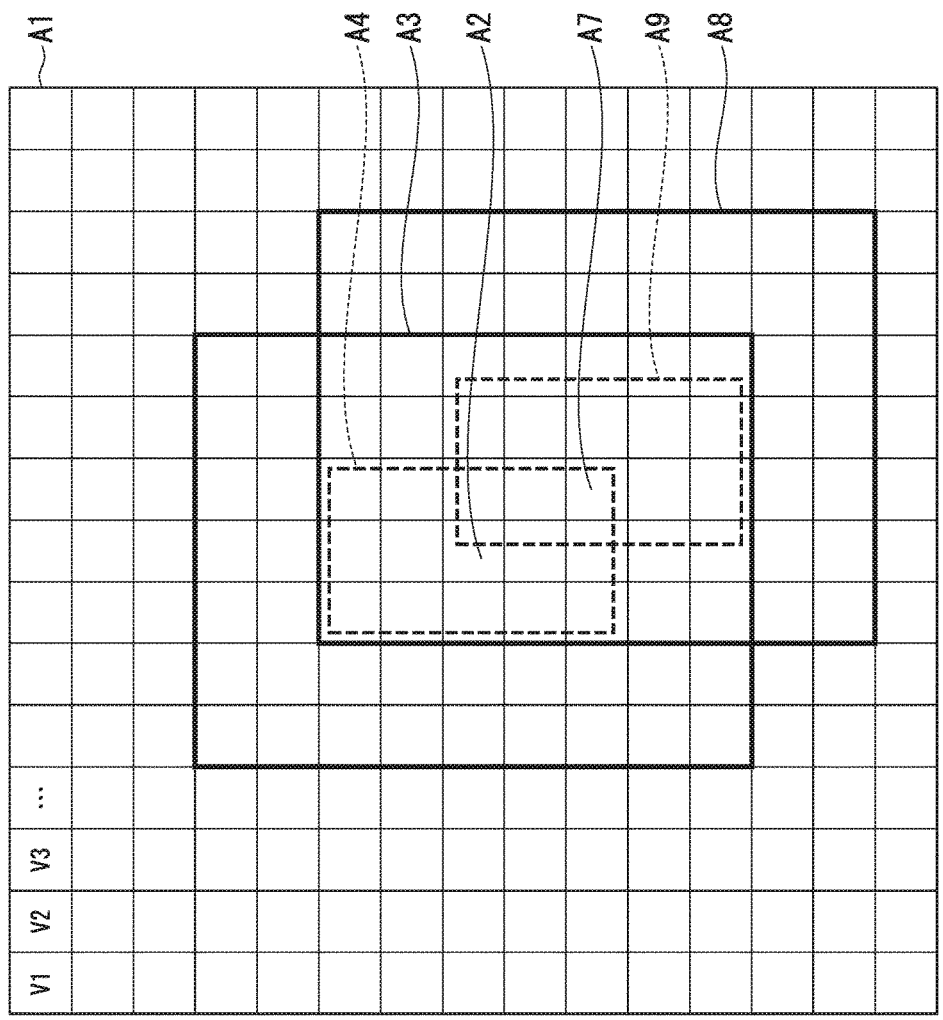
FIG. 7 is a diagram showing a relationship among the video gallery data, the distribution range, and the display range of the terminal device in the embodiment.

FIG. 7 is a diagram showing a relationship among the video gallery data, the distribution range, and the display range of the terminal device 7. In the present embodiment, the video gallery data indicates the gallery arrangement of video data when square display images having the same size are arranged in a tiling manner in the horizontal and vertical directions. As shown in FIG. 7, the video gallery data indicates that video data items having video IDs V1, V2, V3, . . . are arranged from the upper-left corner. A virtual screen A1 represents the entire screen when the display images are virtually arranged and displayed according to the arrangement indicated by the video gallery data.

For example, the transmission range determination unit 515 determines a transmission range A3 so that an initial display position A2 is the center of A3. The transmission range A3 is a range of the video gallery as the video gallery display screen transmitted to the terminal device 7 and is greater than a display range A4 which is the possible display size of the display unit 72 of the terminal device 7. Here, for the display images of the video data items in the video gallery display screen, part of each outermost display image included in the display range A4 is cut by the outer periphery of the display range A4. That is, the longitudinal and lateral lengths of the display range A4 are each not divisible by the lengths of the corresponding sides of the display image.

In FIG. 6, the video gallery display screen generation unit 516 reads out the video IDs corresponding to individual arrangement positions included in the transmission range determined by the transmission range determination unit 515. The video gallery display screen generation unit 516 generates the video gallery display screen on which the display images of the video data items are arranged and displayed at the arrangement positions included in the transmission range, where the video data items are generated by the gallery display video generation unit 514 from the video data items of the video IDs corresponding to the arrangement positions (see FIG. 6, step S315). In the video gallery display screen, one or both of information which indicates the arrangement position of the display image of each video data item in the video gallery data and information (e.g., video ID) utilized to identify the video data item are added to the display image of the video data item. The gallery display video generation unit 514 distributes the generated video gallery display screen to the terminal device 7 which transmitted the video gallery data distribution request (see FIG. 6, step S320).

In FIG. 5, the gallery display control unit 751 of the terminal device 7 receives the video gallery display screen from the video distribution device 5 (see FIG. 5, step S210). The gallery display control unit 751 determines a display range on the received video gallery display screen.

Figure 8:
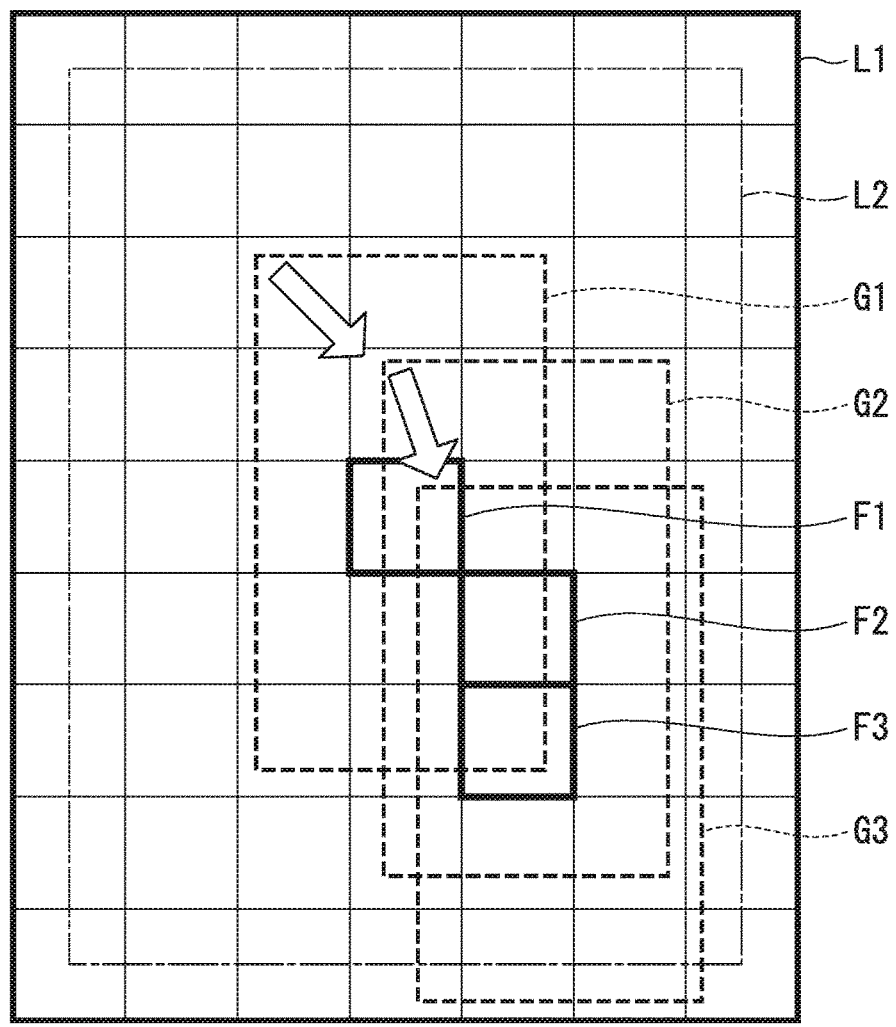
FIG. 8 is a diagram which shows a display range for display by the display unit of the terminal device in the embodiment.

FIG. 8 is a diagram which shows a display range for display by the display unit 72 of the terminal device 7. The gallery display control unit 751 may determine a display range G1 in a manner such that the center of a received video gallery display screen L1 is the center of this display range. The gallery display control unit 751 also determines video data, whose display image is displayed at a predetermined display position within the display range G1, to be currently selected video data. For example, the gallery display control unit 751 determines video data, whose display image is displayed at a display position F1 which includes the center of the display range, to be the currently selected video data.

In FIG. 5, the gallery display control unit 751 of the terminal device 7 makes the display unit 72 display the video gallery display screen included in the determined display range, where information is added to the display image of the currently selected video data so as to indicate the currently selected state (see FIG. 5, step S215).

Figure 9:
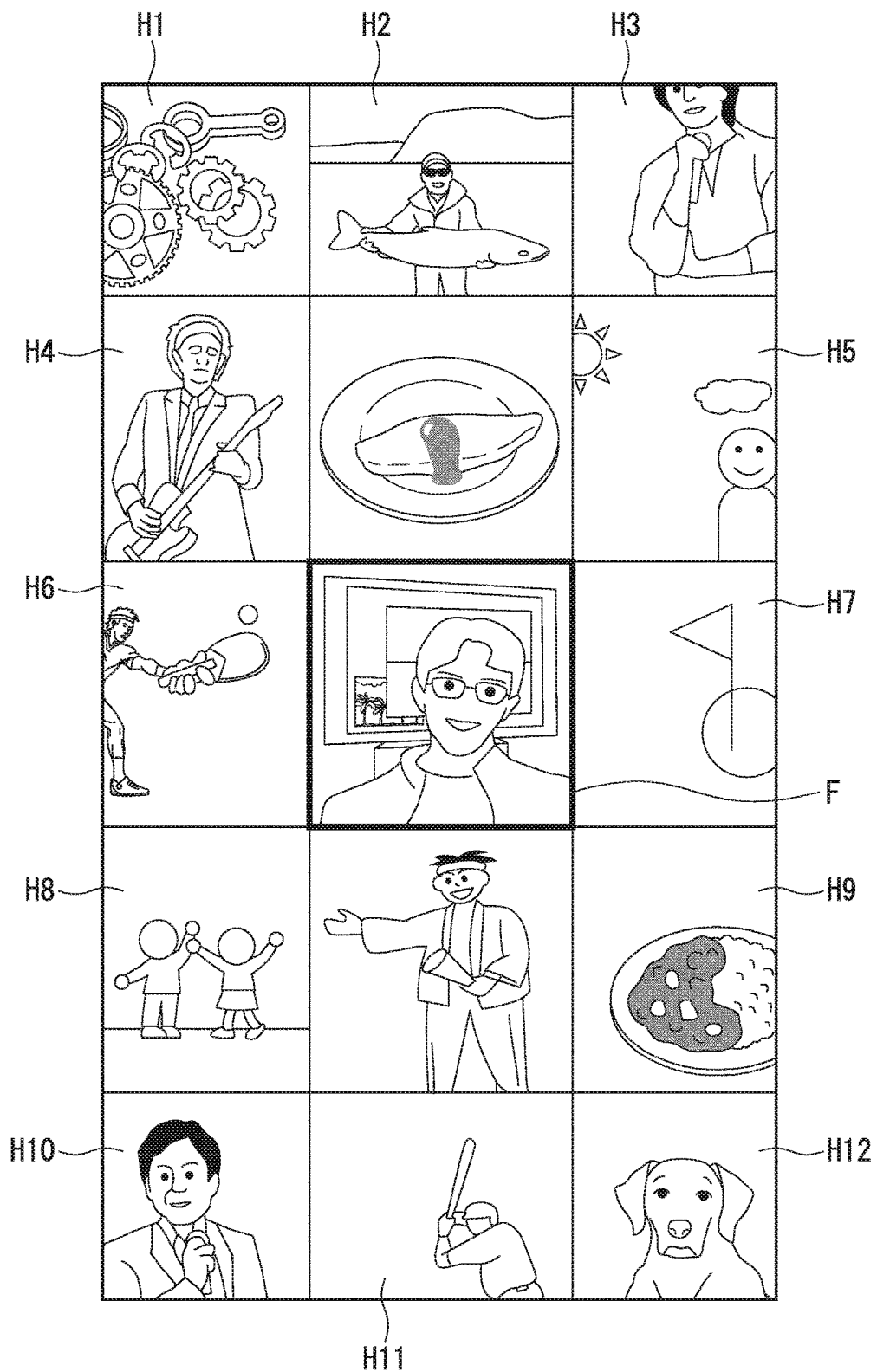
FIG. 9 is a diagram showing an example of the video gallery display screen displayed by the display unit of the terminal device in the embodiment.

FIG. 9 is a diagram showing an example of the video gallery display screen displayed by the display unit 72 of the terminal device 7. As shown in FIG. 9, the display unit 72 displays a gallery in which the display images of video data items are arranged in a tiling manner in the horizontal and vertical directions. The outermost display images H1 to H12 are displayed by the display unit 72 in a manner such that part of each display image is cut by the outer periphery of the display range of the display unit 72. In addition, an outer frame F is applied to the center display image in the gallery so as to indicate that it is a display image of the currently selected video data.

As described above, since part of each outermost display image is hidden outside the display range, it is possible to make the user recognize that there are further display images outside the display range and that the display range is movable. According to such a display, it is possible for the video providing site to spread out the gallery display and create a fun or cheerful experience for the user. It is also possible to attract the attention of the user for the display images outside the current display range.

Returning to FIG. 5, the sound control unit 752 of the terminal device 7 transmits selected video information, which is utilized to identify the currently selected video determined by the gallery display control unit 751, to the video distribution device 5 (see FIG. 5, step S220). To obtain the selected video information to be utilized, the sound control unit 752 may retrieve information, which indicates the arrangement position of the currently selected video data, or the video ID from the video gallery display screen. As another example, the user may perform an operation of designating the currently selected video data. The sound control unit 752 transmits to the video distribution device 5, the selected video information utilized to identify the currently selected video which is designated according to the operation accepted by the operation acceptance unit 73.

In FIG. 6, when it is determined that the video gallery data distribution request has not been received (i.e., "NO" in step S305 in FIG. 6), the display position receiving unit 517 of the video distribution device 5 determines whether or not the selected video information has been received (see FIG. 6, step S325). If no selected video information has been received, the display position receiving unit 517 terminates the operation of the flow (i.e., "NO" in step S325 in FIG. 6). Here, it is assumed that the display position receiving unit 517 determines that the selected video information has been received from the terminal device 7 (i.e., "YES" in step S325 in FIG. 6). The display position receiving unit 517 distributes sound data of the video data, which is identified by the received selected video information, to the terminal device 7 which transmitted the selected video information (see FIG. 6, step S330).

In another example, the sound distribution unit 518 may generate superimposed sound data of the sound of the video data identified by the selected video information and the sound of each video data item whose display image is displayed in the vicinity of the above video data and transmit the superimposed sound data to the terminal device 7. In this case, the sound distribution unit 518 identifies the arrangement position of the currently selected video data in the video gallery according to the selected video information received by the display position receiving unit 517. The sound distribution unit 518 further identifies other video data items whose display images are arranged within a predetermined range from the arrangement position of the currently selected video data in the video gallery. The sound distribution unit 518 generates superimposed sound data of the sound of the currently selected video data and the sounds of the identified other video data items, where the volume of each sound is determined depending on the arrangement position in the video gallery data.

Figure 10:
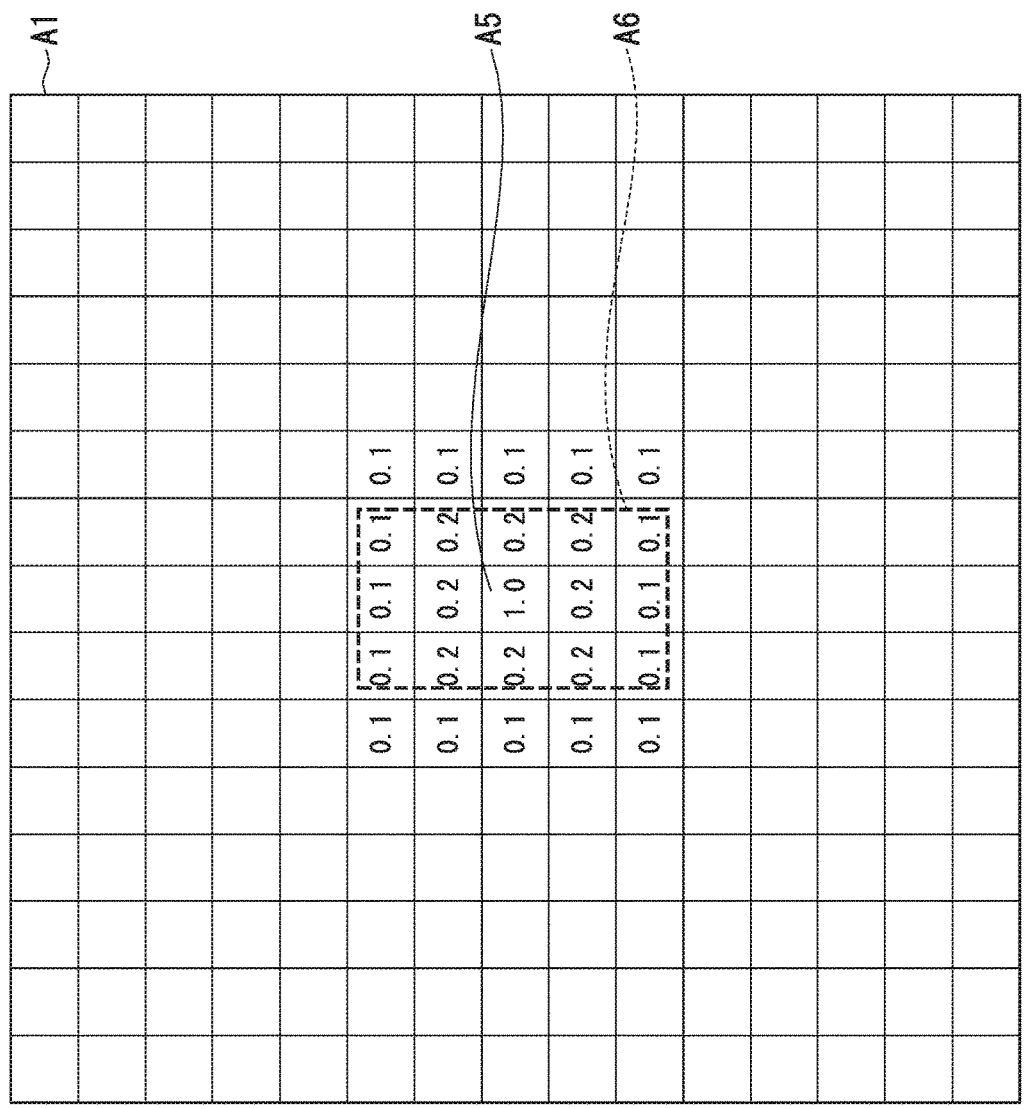
FIG. 10 is a diagram showing an example of the rate among superimposed sound data items in the embodiment.

FIG. 10 is a diagram showing an example of the rate among the superimposed sound data items. In FIG. 10, when the volume for the currently selected video data is 1.0, the volume of the video data items arranged adjacent to the arrangement position A5 of the currently selected video data is 0.2, and the volume of the video data items which surround such adjacent items is 0.1. Here, sound data of video data at each arrangement position which has no numerical value is not superimposed.

The range and rate utilized to superimpose sound data are not limited. In FIG. 10, although sounds of some video data items outside a display range A6 of the terminal device 7 are superimposed, sounds of only video data items whose display images are included in the display range A6 may be superimposed.

As described above, not only the sound of the currently selected video in the gallery display at the terminal device 7, but also the sounds of the peripheral videos are superimposed. Therefore, it is possible for the video providing site to create a fun and cheerful experience for the user.

The sound distribution unit 518 distributes the generated sound data to the terminal device 7.

In FIG. 5, the sound control unit 752 of the terminal device 7 makes the sound output unit 74 output reproduced sound of the sound data received from the video distribution device 5 (see FIG. 5, step S225).

The gallery display control unit 751 determines whether or not the current display range has reached a predetermined range from the outer periphery of the video gallery display screen (see FIG. 5, step S230). In FIG. 8, a boundary L2 is away from the outer periphery of the video gallery display screen L1 by a predetermined distance. The gallery display control unit 751 determines whether or not part of the current display range G1 is included in a space between the outer periphery of the video gallery display screen L1 and the boundary L2. If the gallery display control unit 751 determines that the current display range has not reached the predetermined range from the outer periphery of the video gallery display screen (i.e., "NO" in step S230 in FIG. 5), the operation is shifted to a standby state.

Here, the operation acceptance unit 73 in the terminal device 7 accepts a display movement operation to move the display position of the video gallery (i.e., "YES" in step S235 in FIG. 5). The display movement operation may be a swiping or flicking operation on the screen displayed by the display unit 72. The gallery display control unit 751 makes the display unit 72 display the current display range on the video gallery display screen while moving the current display range in accordance with the moving direction and the moving distance according to the display movement operation accepted by the operation acceptance unit 73 (see FIG. 5, step S240).

As shown in FIG. 8, the gallery display control unit 751 moves the current display range G1 on the video gallery display screen L1 to a display range G2 according to the display movement operation accepted by the operation acceptance unit 73 and makes the display unit 72 display the display range G2. In this process, the gallery display control unit 751 determines the display range G2 in a manner such that part of each outermost display image included in the display range G2 is cut by the outer periphery of the display range G2. Furthermore, the gallery display control unit 751 determines video data, whose display image is displayed at a display position F2, to be the currently selected video data, where the center of the display range G2 after the movement is included in F2. The gallery display control unit 751 displays the outer frame F, which indicates the currently selected video, by changing the target of the frame F from the display image at the display position F1 to the display image at the display position F2.

The video distribution system 1 repeats the operation from step S220 in FIG. 5. That is, the sound control unit 752 of the terminal device 7 transmits the selected video information, which is utilized to identify the currently selected video determined by the gallery display control unit 751, to the video distribution device 5 (see FIG. 5, step S220). The display position receiving unit 517 of the video distribution device 5 receives the selected video information (i.e., "NO" in step S305 and "YES" in step S325 in FIG. 6). The sound distribution unit 518 distributes sound data of the video data, which is identified by the selected video information, to the terminal device 7 (see FIG. 6, step S330). The sound control unit 752 of the terminal device 7 makes the sound output unit 74 output reproduced sound of the sound data received from the video distribution device 5 (see FIG. 5, step S225). The gallery display control unit 751 determines that the current display range G2 has not reached the predetermined range from the outer periphery of the video gallery display screen (i.e., "NO" in step S230 in FIG. 5), the operation is shifted to a standby state.

Here, it is assumed that the operation acceptance unit 73 in the terminal device 7 accepts the display movement operation to move the display position of the video gallery (i.e., "YES" in step S235 in FIG. 5). As shown in FIG. 8, the gallery display control unit 751 moves the current display range on the video gallery display screen L1 from the display range G2 to a display range G3 according to the display movement operation and makes the display unit 72 display the display range G3. In this process, the gallery display control unit 751 determines the display range G3 in a manner such that part of each outermost display image included in the display range G3 is cut by the outer periphery of the display range G3. Furthermore, the gallery display control unit 751 determines video data, whose display image is displayed at a display position F3, to be the currently selected video data, where the center of the display range G3 is included in F3. The gallery display control unit 751 displays the outer frame F, which indicates the currently selected video, by changing the target of the frame F from the display image at the display position F2 to the display image at the display position F3.

The sound control unit 752 of the terminal device 7 transmits the selected video information, which is utilized to identify the currently selected video determined by the gallery display control unit 751, to the video distribution device 5 (see FIG. 5, step S220). The display position receiving unit 517 of the video distribution device 5 receives the selected video information (i.e., "NO" in step S305 and "YES" in step S325 in FIG. 6). The sound distribution unit 518 distributes sound data of the video data, which is identified by the selected video information, to the terminal device 7 (see FIG. 6, step S330).

The sound control unit 752 of the terminal device 7 makes the sound output unit 74 output reproduced sound of the sound data received from the video distribution device 5 (see FIG. 5, step S225).

Since part of the display range G3 is included in a space between the outer periphery of the video gallery display screen L1 and the boundary L2, the gallery display control unit 751 determines that the current display range enters the predetermined range from the outer periphery of the video gallery display screen (i.e., "YES" in step S230 in FIG. 5). The gallery display control unit 751 transmits the video gallery data distribution request, which includes information that indicates the display position of videos, to the video distribution device 5 (see FIG. 5, step S245). The information that indicates the display position of videos may be a predetermined display position of the display range G3, for example, information which indicates the arrangement position of the display image that includes the center of the display range G3 or the video ID of the video data whose display image is displayed at the arrangement position.

In FIG. 6, the transmission range determination unit 515 of the video distribution device 5 receives the video gallery data distribution request from the terminal device 7 (i.e., "YES" in step S305 in FIG. 6). The transmission range determination unit 515 obtains the information that indicates the display position from the video gallery data distribution request. The transmission range determination unit 515 retrieves the video gallery data from the storage unit 511, and determines, in accordance with the display position indicated by the obtained information, a rectangular transmission range in the retrieved video gallery data, where the range has a size greater than the possible display range of the terminal device 7 by a predetermined value (see FIG. 6, step S310).

For example, as shown in FIG. 7, the transmission range determination unit 515 determines a transmission range A8 whose center corresponds to a display position A7 indicated by the information obtained from the video gallery data distribution request. The transmission range A8 has the same size as that of the transmission range A3 and includes at least the current display range A9 of the terminal device 7.

In FIG. 6, the video gallery display screen generation unit 516 reads out the video IDs corresponding to individual arrangement positions included in the transmission range determined by the transmission range determination unit 515. The video gallery display screen generation unit 516 generates the video gallery display screen on which the display images of the video data items are arranged and displayed at the arrangement positions included in the transmission range, where the video data items are generated by the gallery display video generation unit 514 from the video data items of the video IDs corresponding to the arrangement positions (see FIG. 6, step S315). The gallery display video generation unit 514 distributes the generated video gallery display screen to the terminal device 7 (see FIG. 6, step S320).

In FIG. 5, the gallery display control unit 751 of the terminal device 7 receives the new video gallery display screen from the video distribution device 5 (see FIG. 5, step S250). The gallery display control unit 751 identifies the current display range on the received new video gallery display screen, and the operation is shifted to a standby state (see FIG. 5, step S255). When the operation acceptance unit 73 in the terminal device 7 accepts the display movement operation to move the display position in the video gallery (i.e., "YES" in step S235 in FIG. 5), the processes from step S240 are performed by using the new video gallery display screen. Accordingly, the terminal device 7 makes the display unit 72 display the display range on the new video gallery display screen while moving the display range from the identified display range, according to the display movement operation.

If the operation acceptance unit 73 receives a display instruction operation for video data in the standby state (i.e., "NO" in step S235 and "YES" in step S260 in FIG. 5), the terminal device 7 executes a video display operation flow shown in FIG. 11 explained later. The display instruction operation for video data, performed on the screen displayed by the display unit 72, is a user's tapping or double-tapping operation on the display range of the image of video data as the display target. If the operation acceptance unit 73 receives an operation other than the display movement operation or the display instruction operation in the standby state (i.e., "NO" in step S260 in FIG. 5), the control unit 75 performs the process according to the relevant operation (see FIG. 5, step S265). The terminal device 7 then enters the standby state, and the operation from step S235 is performed or the operation of FIG. 5 is terminated.

The gallery display control unit 751 may limit the amount of movement for one display movement operation.

Accordingly, it is possible to prevent the display range from quickly reaching the predetermined range from the outer periphery of the video gallery display screen, which causes frequent transmission of the video distribution request. It is also possible to prevent that before the next video gallery display screen is received, part of the display range becomes out of the range of the current video gallery display screen.

If the terminal device 7 received and displayed a video gallery display screen in the past, the gallery display control unit 751 may include information, which indicates the last display position on the video gallery display screen, in the video gallery data distribution request in step S205 of FIG. 5.

Figure 12:
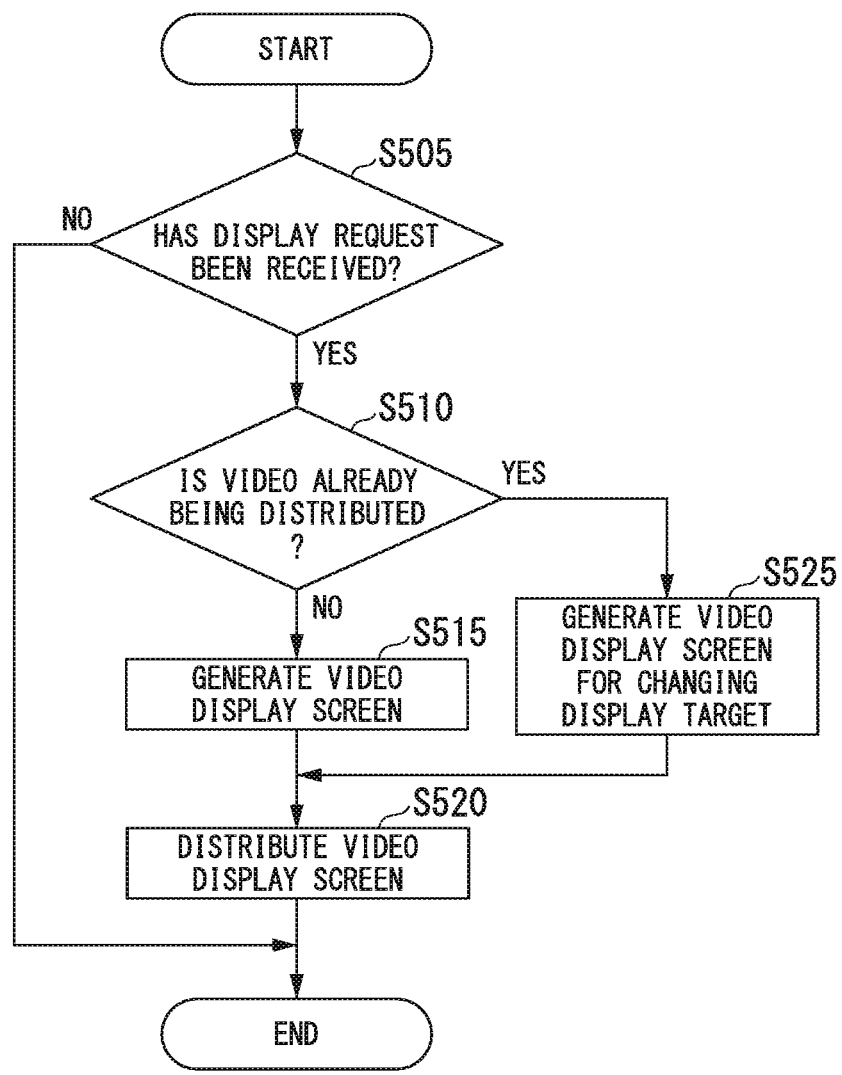
FIG. 12 is a flowchart showing a video display screen distributing operation of the video distribution device in the embodiment.
Figure 13:
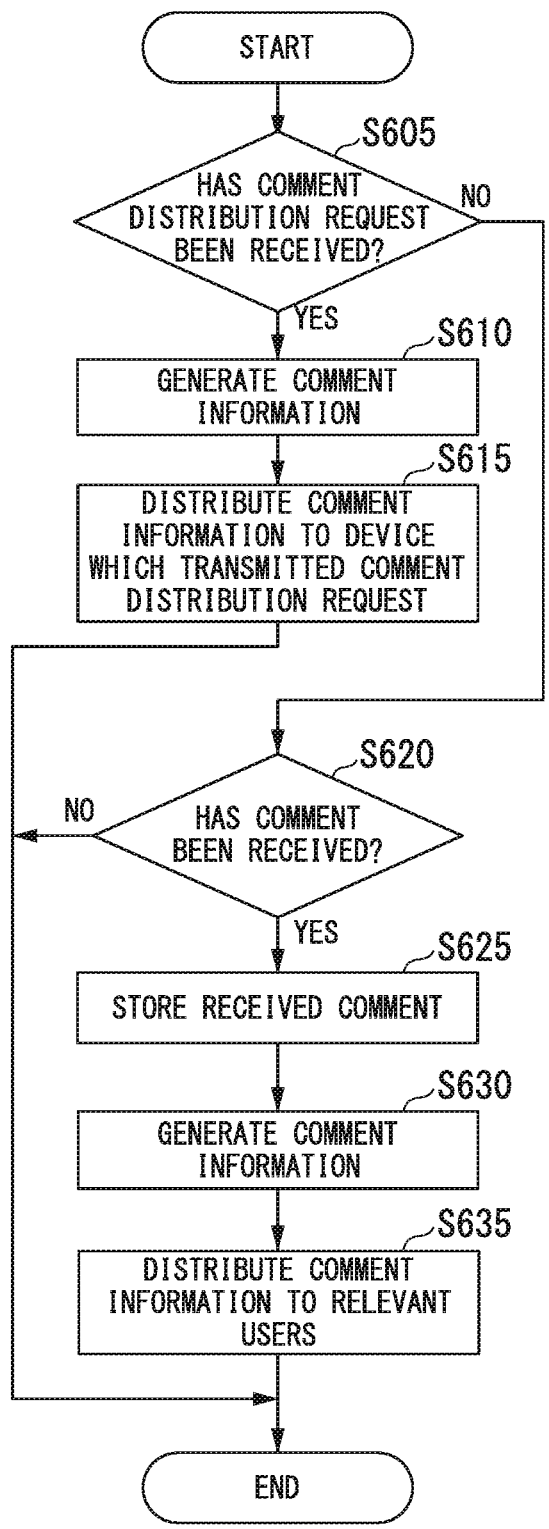
FIG. 13 is a flowchart showing a comment distribution operation of the video distribution device in the embodiment.

Next, the video distribution operation of the video distribution system 1 will be explained with reference to operation flows in FIGS. 11 to 13. FIG. 11 is a diagram showing a video display operation flow performed by the terminal device 7. FIG. 12 is a diagram showing a video display screen distributing operation flow performed by the video distribution device 5. FIG. 13 is a diagram showing a comment distribution operation flow performed by the video distribution device 5.

Figure 11:
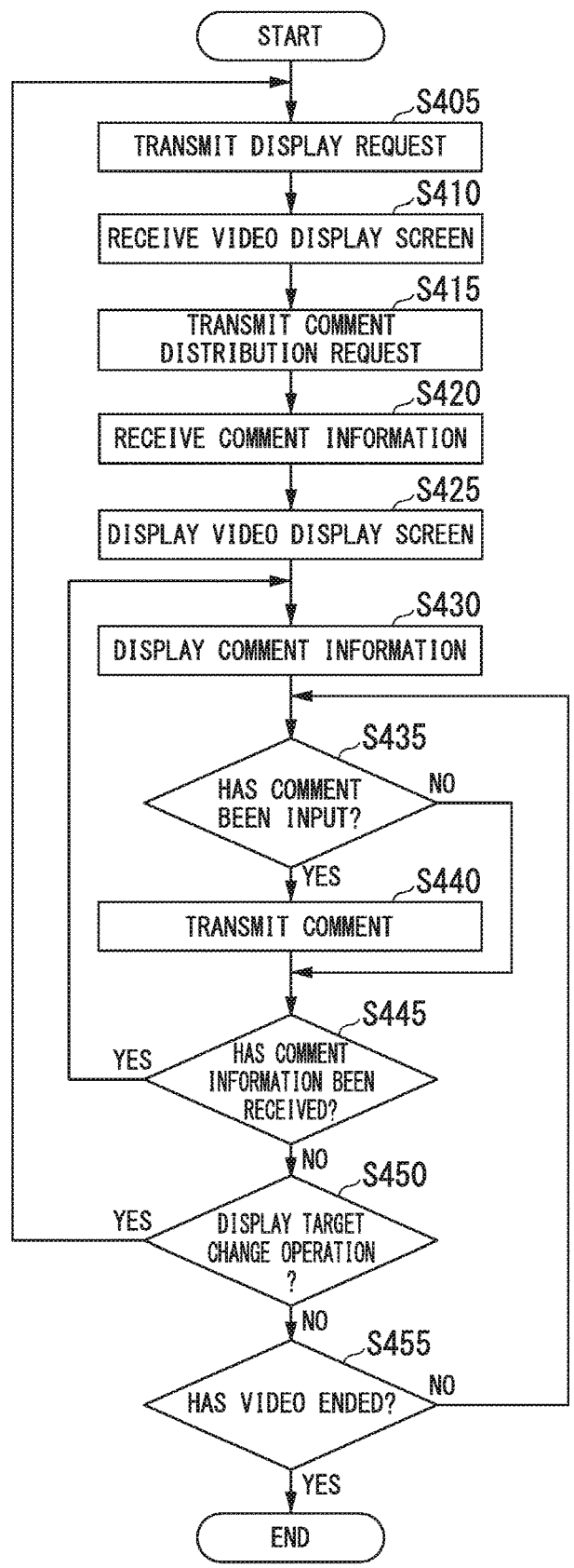
FIG. 11 is a flowchart showing a video display operation of the terminal device in the embodiment.

In FIG. 11, the video display control unit 753 of the terminal device 7 transmits a display request which includes display target video information utilized to identify video data selected as a display target by the display instruction operation (see FIG. 11, step S405). The video display control unit 753 may retrieve information, which indicates the video ID or the arrangement position of the selected video data, from the video gallery display screen and use the information as the display target video information.

In FIG. 12, the video display screen generation unit 519 of the video distribution device 5 determines whether or not the display request has been received (see FIG. 12, step S505). If the video display screen generation unit 519 determines that the display request has not been received, the operation flow is terminated (i.e., "NO" in step S505 in FIG. 12). Here, it is determined that the display request has been received (i.e., "YES" in step S505 in FIG. 12). The video display screen generation unit 519 then determines whether or not a video display screen is already being distributed to the terminal device 7 which transmitted the display request (see FIG. 12, step S510). If it is determined that no video display screen has been distributed to the terminal device 7 which transmitted the display request (i.e., "NO" in step S510 in FIG. 12), the video display screen generation unit 519 performs the process in step S515.

The video display screen generation unit 519 obtains the video ID of the video data as the display target (called a "display target video ID" below) from the display target video information which is included in the received display request. If the display target video information indicates the arrangement position, the video display screen generation unit 519 retrieves the video ID corresponding to the arrangement position from the video gallery data and determines the retrieved ID to be the display target video ID.

The video display screen generation unit 519 identifies the arrangement position corresponding to the display target video ID in the video gallery data and retrieves video IDs of other video data items at arrangement positions adjacent to the identified arrangement position. In the present embodiment, the video display screen generation unit 519 retrieves a video ID (called a "right-adjacent video ID" below) at an arrangement position adjacent to and on the right side of the arrangement position corresponding to the display target video ID and a video ID (called a "left-adjacent video ID" below) at an arrangement position adjacent to and on the left side of the arrangement position corresponding to the display target video ID.

Among the video data received by the video reception unit 513, the video display screen generation unit 519 obtains video data as the display target identified by the display target video ID; video data identified by the right-adjacent video ID; and video data identified by the left-adjacent video ID. The video display screen generation unit 519 generates a video display screen in which (i) the image of the video data as the display target is displayed with a size greater than that of the display images on video gallery display screen and (ii) images of video data items at arrangement positions adjacent to the arrangement position of the display target are displayed adjacent to the image of the display target in a manner such that part of each adjacent image is cut by the outer periphery of the screen (see FIG. 12, step S515).

For example, the video display screen generation unit 519 arranges the image of the video data having the right-adjacent video ID on the right side of the image of the video data as the display target and arranges the image of the video data having the left-adjacent video ID on the left side of the image of the video data as the display target on the video display screen. The video IDs of the displayed video data items are added to the video display screen. The video display screen generation unit 519 distributes the generated video display screen to the terminal device 7 which transmitted the display request (see FIG. 12, step S520).

In FIG. 11, the video display control unit 753 of the terminal device 7 receives the video display screen from the video distribution device 5 (see FIG. 11, step S410). The comment processing unit 754 transmits a comment distribution request, which includes the video ID of the video data as the display target, to the video distribution device 5 (see FIG. 11, step S415).

In FIG. 13, the comment distribution processing unit 53 of the video distribution device 5 determines whether or not the comment distribution request has been received (see FIG. 13, step S605). Here, the comment distribution processing unit 53 determines that the comment distribution request has been received (i.e., "YES" in step S605 in FIG. 13). The comment distribution unit 533 obtains the video ID included in the comment distribution request. The comment distribution unit 533 retrieves comment data associated with the obtained video ID from the comment storage unit 532, where a predetermined number of comment data items are retrieved starting from an item having the latest posting time. The comment data includes the video ID of the video data as the target for the comment, comment posting time, a user ID of a user who posted the comment, and text data of the content of the comment.

For each retrieved comment data item, the comment distribution unit 533 retrieves a user name and an icon image data, which are stored, in advance, in the storage unit 511 or the comment storage unit 532 in association with the user ID included in the comment data. The comment distribution unit 533 generates comment information which includes the content of the comment (comment content) and the posting time in the comment data, and the user name and the icon image data retrieved according to the user ID in the comment data (see FIG. 13, step S610). The comment distribution unit 533 transmits the generated comment information to the terminal device 7 which transmitted the comment distribution request (see FIG. 13, step S615).

In FIG. 11, the comment processing unit 754 of the terminal device 7 receives the comment information from the video distribution device 5 (see FIG. 11, step S420). The video display control unit 753 makes the display unit 72 display the video display screen received in step S410 (see FIG. 11, step S425). The comment processing unit 754 also makes the display unit 72 display the comment information received in step S420, in addition to the video display screen being displayed by the display unit 72, where the comment information items are displayed in order of the posting time (see FIG. 11, step S430).

Figure 14:
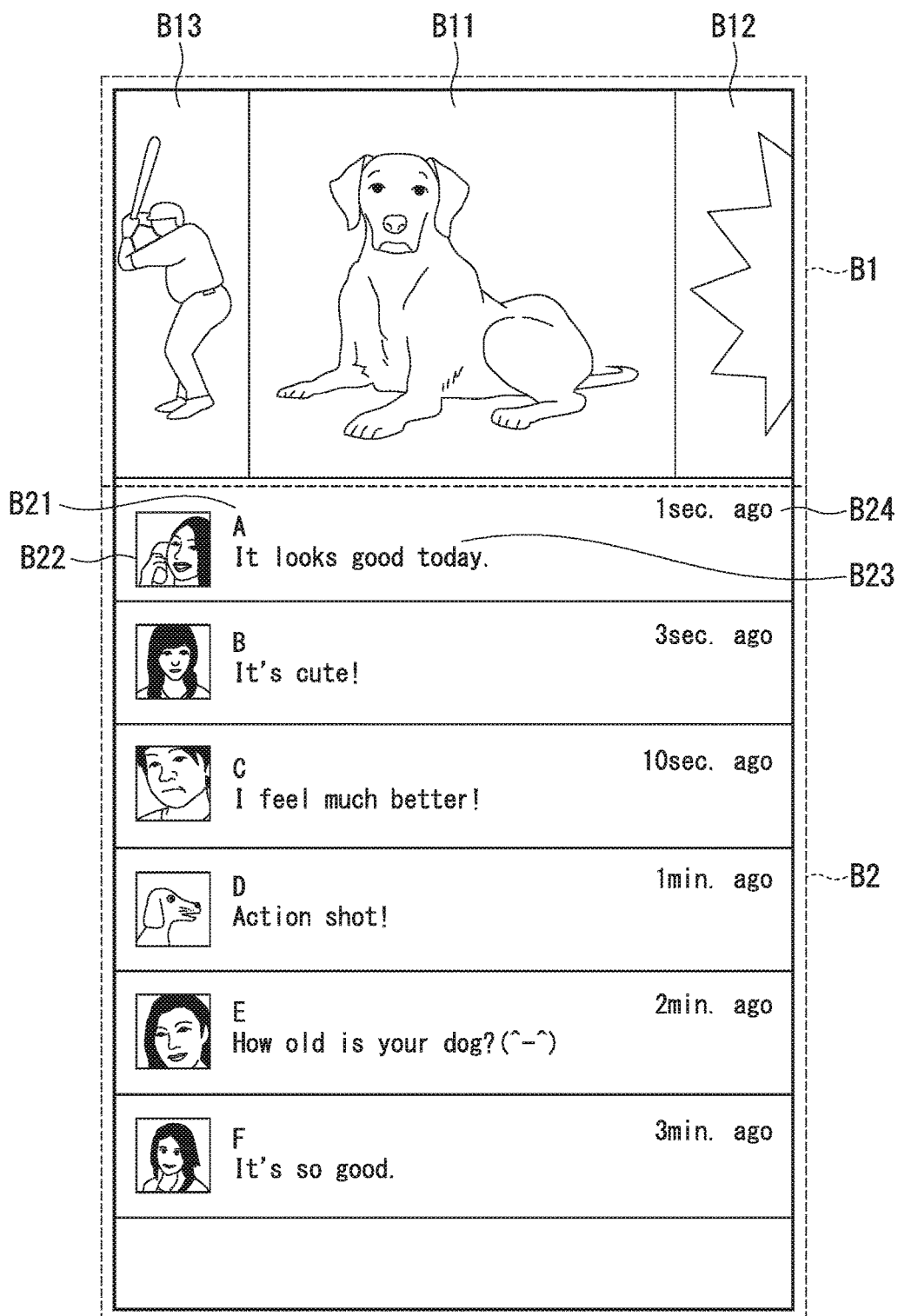
FIG. 14 is a diagram showing an example of the video display screen displayed by the display unit of the terminal device in the embodiment.
Figure 15:
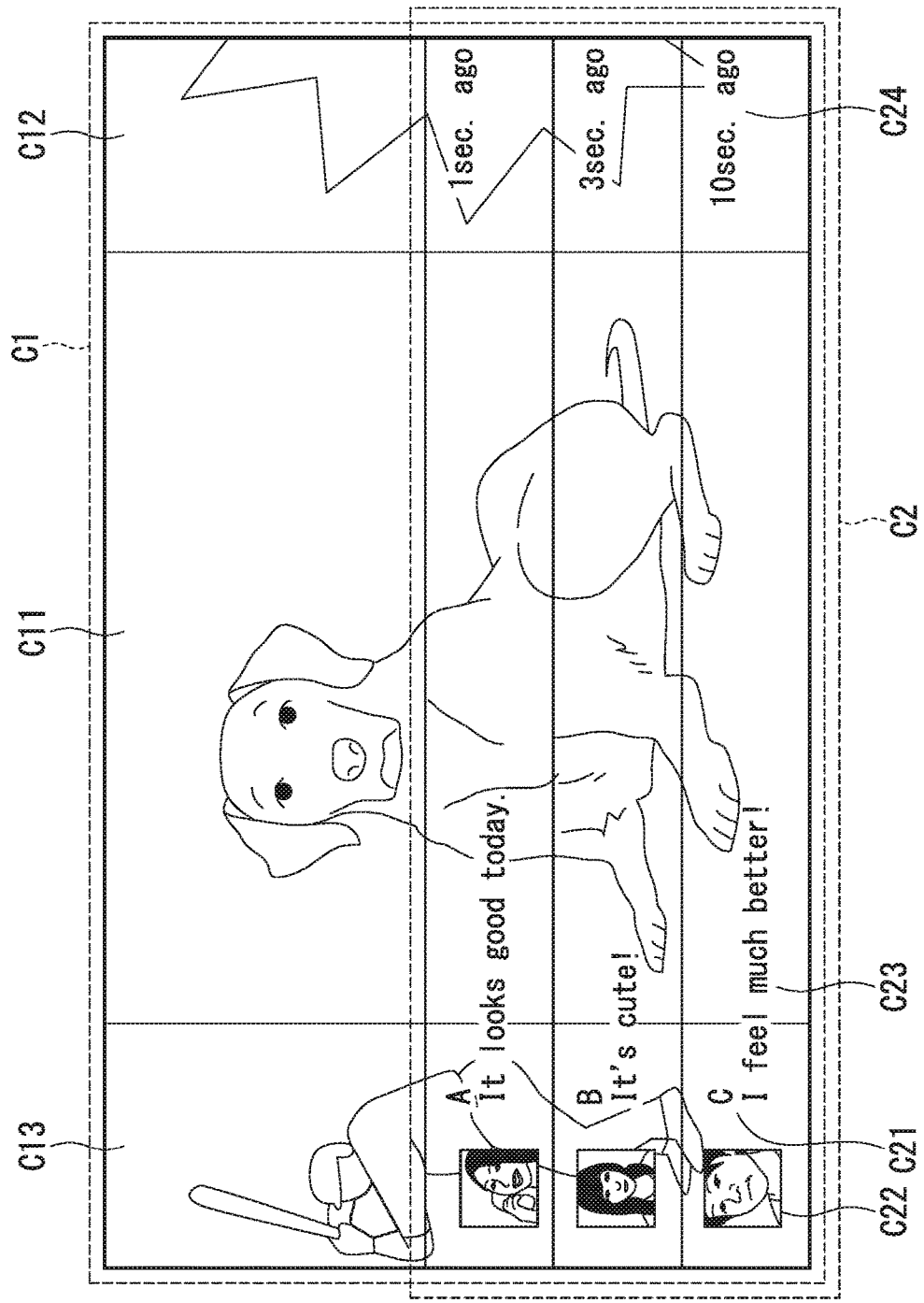
FIG. 15 is a diagram showing another example of the video display screen displayed by the display unit of the terminal device in the embodiment.

FIGS. 14 and 15 are diagrams showing examples of the video display screen displayed by the display unit 72 of the terminal device 7.

FIG. 14 is an example when the display unit 72 is used in a vertically long state. As shown in FIG. 14, the screen displayed by the display unit 72 has a video display region B1 and a comment display region B2 which is arranged under the video display region B1. The video display region B1 consists of display regions B11, B12, and B13. In the display region B11, the display image of the video data as the display target is displayed. In the adjacent display region B12 on the right side of the display region B11, the image of the video data having the right-adjacent video ID is displayed. In the adjacent display region B13 on the left side of the display region B11, the image of the video data having the left-adjacent video ID is displayed. For the video data of the right-adjacent video ID and the video data of the left-adjacent video ID, their images are displayed in a manner such that part of each image is cut by the outer periphery of the display unit 72. In the comment display region B2, the comment information items are displayed in order of the posting time starting from the item having the latest posting time. Each comment information item includes a user name B21, icon image data B22, a comment content B23, and a posting time B24. The comment processing unit 754 displays the posting time B24 while frequently updating it according to the difference between the current time and the posting time.

FIG. 15 is an example when the display unit 72 is used in a horizontally long state. As shown in FIG. 15, the screen displayed by the display unit 72 has a video display region C1 and a comment display region C2 which is superimposed on a lower part of the video display region C1. The video display region C1 consists of display regions C11, C12, and C13. In the display region C11, the display image of the video data as the display target is displayed. In the adjacent display region C12 on the right side of the display region C11, the image of the video data having the right-adjacent video ID is displayed. In the adjacent display region C13 on the left side of the display region C11, the image of the video data having the left-adjacent video ID is displayed. For the video data of the right-adjacent video ID and the video data of the left-adjacent video ID, their images are displayed in a manner such that part of each image is cut by the outer periphery of the display unit 72. In the comment display region C2, the comment information items are displayed in order of the posting time starting from the item having the latest posting time. Each displayed comment information item includes a user name C21, icon image data C22, a comment content C23, and a posting time C24.

When the video display screen as shown in FIG. 14 or 15 is displayed by the terminal device 7, the user can also watch part of the other video data items while watching the video data as the display target. Therefore, when the user watches the video designated as the display target, it is possible for the user to tend to take an interest in other video data without annoying the user. In addition, since part of each video data item on both sides of the center video is cut by the outer periphery of the screen and thus only part of the video data item is displayed, the user can recognize that the display target can be shifted to the video data item if the user takes an interest therein.

Here, it is assumed that the operation acceptance unit 73 receives a comment input operation by the user while the display unit 72 displays the video display screen. In FIG. 11, the comment processing unit 754 of the terminal device 7 determines that the comment input operation has been accepted (i.e., "YES" in step S435 in FIG. 11), and the comment processing unit 754 transmits comment data to the video distribution device 5 (see FIG. 11, step S440). The comment data includes the video ID of the video data as the display target, the user ID, the content of the comment accepted by the operation acceptance unit 73, and the comment posting time.

In FIG. 13, when the comment distribution processing unit 53 of the video distribution device 5 determines that the comment distribution request has not been received (i.e., "NO" in step S605 in FIG. 13), the comment distribution processing unit 53 determines whether or not comment data has been received (see FIG. 13, step S620). If the comment distribution processing unit 53 determines that comment data has not been received (i.e., "NO" in step S620 in FIG. 13), the operation flow is terminated. Here, the comment distribution processing unit 53 determines that comment data has been received (i.e., "YES" in step S620 in FIG. 13). The comment reception unit 531 additionally stores the received comment data in the comment storage unit 532 (see FIG. 13, step S625).

The comment distribution unit 533 retrieves a user name and an icon image data, which are stored, in advance, in the storage unit 511 or the comment storage unit 532 in association with the user ID included in the additionally stored comment data. The comment distribution unit 533 generates comment information which includes the content of the comment (comment content) and the posting time in the comment data, and the user name and the icon image data retrieved according to the user ID in the comment data (see FIG. 13, step S630). The comment distribution unit 533 distributes the generated comment information to the terminal device 7 of each user who is watching the video data of the video ID included in the additionally stored comment data (see FIG. 13, step S635). That is, the terminal device 7 to which the comment information is distributed is each terminal device 7 to which the video display screen generation unit 519 is distributing the video display screen in which the video data, which has the video ID included in the additionally stored comment data, is the display target. This terminal device 7 is not only the terminal device 7 which transmitted the comment data, but also other terminal devices 7 whose display target of the video data is the same as that of the terminal device 7 which transmitted the comment data.

In FIG. 11, after the process of step S440, the comment processing unit 754 of the terminal device 7, which transmitted the comment data, receives the comment information from the video distribution device 5 (i.e., "YES" in step S445 in FIG. 11) and performs the operation from step S430. In contrast, the comment processing unit 754 of said other terminal devices 7 determines that no comment input has been performed in step S435 (i.e., "NO" in step S435 in FIG. 11), then receives the comment information (i.e., "YES" in step S445 in FIG. 11) and performs the operation from step S430.

The comment processing unit 754 makes the display unit 72 additionally display the received comment information as the latest comment information on the video display screen displayed by the display unit 72 (see FIG. 11, step S430). If the comment processing unit 754 has already displayed a maximum (possible) number of comment information items at the display unit 72, the comment processing unit 754 deletes the comment information having the oldest posting time and makes the display unit 72 additionally display the received comment information. Accordingly, the comment content which was input for the video data as the display target by the own terminal device or another terminal device 7 is displayed by the comment processing unit 754 on the video display screen.

If the comment processing unit 754 of the terminal device 7 determines that no comment input has been performed (i.e., "NO" in step S430 in FIG. 11) and that no comment information has been received (i.e., "NO" in step S445 in FIG. 11), the video display control unit 753 determines whether or not a display target change operation has been received (see FIG. 11, step S450). The display target change operation is a swiping or flicking operation on the screen displayed by the display unit 72. For example, in order to determine the video data displayed in the display region B12 of FIG. 14 or the display region C12 of FIG. 15 to be a new display target, the display target change operation is the swiping or flicking operation from right to left. Similarly, in order to determine the video data displayed in the display region B13 of FIG. 14 or the display region C13 of FIG. 15 to be a new display target, the display target change operation is the swiping or flicking operation from left to right.

When the video display control unit 753 determines that the display target change operation has been received (i.e., "YES" in step S450 in FIG. 11), the operation from step S405 is repeated. In step S405, the video display control unit 753 determines the video data as the new display target in accordance with the display target change operation and transmits the display request which includes the video ID (as the display target video information) of the video data determined to be the new display target. The display target video information may be information which indicates the video ID of the video data as the current display target and the direction of the display target change operation.

In FIG. 12, the video display screen generation unit 519 of the video distribution device 5 determines that the display request has been received (i.e., "YES" in step S505 in FIG. 12). The video display screen generation unit 519 also determines that a video display screen is already being distributed to the terminal device 7 which transmitted the display request (i.e., "YES" in step S510 in FIG. 12). The video display screen generation unit 519 retrieves the video ID from the display target video information included in the display request and determines the retrieved ID to be the display target video ID. If the display target video information indicates the video ID of the video data as the current display target and the direction of the display target change operation, the video display screen generation unit 519 identifies the arrangement position corresponding to the video ID in the video gallery data. The video display screen generation unit 519 then obtains the video ID, as the display target video ID, whose arrangement position is adjacent to the identified arrangement position in the direction corresponding to the direction of the display target change operation (e.g., in the right direction if the direction of the operation is right to left).

The video display screen generation unit 519 identifies the arrangement position corresponding to the display target video ID in the video gallery data and retrieves the right-adjacent video ID and the left-adjacent video ID. From the video display screen currently distributed to the terminal device 7, the video display screen generation unit 519 generates a video display screen by moving the image of the video data as the new display target to the display region where the image of the video data as the current display target is displayed (see FIG. 12, step S525). In the generated video display screen, the image of the video data having the right-adjacent video ID is displayed adjacent to and on the right side of the image of the video data as the new display target, and the image of the video data having the left-adjacent video ID is displayed adjacent to and on the left side of the image of the video data as the new display target. The video display screen generation unit 519 distributes the generated video display screen to the terminal device 7 which transmitted the display request (see FIG. 12, step S520).

After the video display control unit 753 of the terminal device 7 receives the video display screen from the video distribution device 5 in step S410 in FIG. 12, an operation similar to that described above is performed.

In step S450, if the video display control unit 753 determines that no display target change operation has been received (i.e., "NO" in step S450 in FIG. 11), the video display control unit 753 determines whether or not the video data as the display target has ended (see step S455). If the video display control unit 753 determines that the video data has not ended, the operation from step S435 is repeated (i.e., "NO" in step S455 in FIG. 11). If it is determined that the video data has ended, the operation flow is terminated (i.e., "YES" in step S455 in FIG. 11).

In the video display screen of the above explanation, only part of each image of other video data items is displayed adjacent to and on the right and left sides of the image of the video data as the display target. However, only part of each image of the other video data items may be displayed adjacent to and on the upper and lower sides of the image of the video data as the display target. In this case, in steps S515 and S525 in FIG. 12, the video display screen generation unit 519 retrieves a video ID (called an "upper-adjacent video ID" below) at an arrangement position adjacent to and on the upper side of the arrangement position corresponding to the display target video ID and a video ID (called a "lower-adjacent video ID" below) at an arrangement position adjacent to and on the lower side of the arrangement position corresponding to the display target video ID. The video display screen generation unit 519 generates a video display screen in which the image of the video data having the upper-adjacent video ID is displayed adjacent to and on the upper side of the image of the video data as the display target and the image of the video data having the lower-adjacent video ID is displayed adjacent to and on the lower side of the image of the video data as the display target.

In addition, although only part of each image of said other video data items is displayed adjacent to and on the right and left sides of the image of the video data as the display target, the entire images of said other video data items may be displayed.

In the above video display screen, as the information which indicates that another video data item can be selected and displayed as the new display target, only part of each image of other video data items is displayed adjacent to and on the right and left sides or the upper and lower sides of the image of the video data as the display target in a manner such that part of said each image is cut by the outer periphery of the screen. However, other information may be employed.

Figure 16:
FIG. 16 is a diagram showing another example of the video display screen displayed by the display unit of the terminal device in the embodiment.

FIG. 16 is a diagram showing another example of the video display screen displayed by the display unit 72 of the terminal device 7, where the display unit 72 is used in a vertically long state. In FIG. 16, as the information which indicates that another video data item can be selected and displayed as the new display target on the video display screen, arrows B31 and B32 are utilized. On the video display screen, the arrow B31, which indicates that video data adjacent to and on the right side of the video data as the display target in the gallery display can be selected as the new display target, is displayed in a region corresponding to the display region B12 in FIG. 14 or the display region C12 in FIG. 15. Additionally, on the video display screen, the arrow B32, which indicates that video data adjacent to and on the left side of the video data as the display target in the gallery display can be selected as the new display target, is displayed in a region corresponding to the display region B13 in FIG. 14 or the display region C13 in FIG. 15.

In addition, in the above embodiment, although the information which indicates that another video data item can be selected and displayed as the new display target is displayed adjacent to the image of the video data as the display target, the information may be displayed at another position.

Additionally, on the video display screen, the video display screen generation unit 519 of the video distribution device 5 may change other video data items, whose images are displayed adjacent to the image of the video data as the display target, at regular time intervals, where any video data may be selected as said other video data after the change.

On the above-described video gallery display screen, the square display images (of the video data items) having the same size are arranged in a tiling manner in the horizontal and vertical directions. However, the display images may have different sizes, and display images having a shape other than the square may be arranged. For example, the longitudinal length of each display image may be a multiple of the length of the side of a square and the lateral length thereof may have any value.

In addition, if the video gallery display screen generation unit 516 of the video distribution device 5 has not received video data for live distribution, whose display image is to be displayed in the transmission range, the video gallery display screen generation unit 516 retrieves content data stored in association with the relevant video data in advance in the storage unit 511. The video gallery display screen generation unit 516 generates a video gallery display screen on which a display screen of the retrieved content data is displayed instead of the video data for the live distribution. For example, the content data is static image data or video data utilized to communicate the start time or the end of the live distribution.

The above embodiment employed an example which uses the video data of live video. However, the video distribution device 5 may perform the above operation by using uploaded video data stored in the storage unit 511 in advance. In this case, the comment data transmitted from the comment processing unit 754 of the terminal device 7 further includes a commenting time which indicates a video reproduction time when the comment (content) was posted, measured from the reproduction starting time of the relevant video data. The comment information distributed from the comment distribution unit 533 of the video distribution device 5 also includes the commenting time. The comment processing unit 754 of the terminal device 7 retrieves the comment information which includes the video reproduction time that coincides with the video reproduction time of the video data displayed on the video display screen. The comment processing unit 754 adds the retrieved comment information to the video display screen so that the comment information is displayed.

As an example, if the operation acceptance unit 73 of the terminal device 7 receives an operation to instruct that no comment is displayed, then even when comment information is distributed from the video distribution device 5, the comment processing unit 754 does not display it.

In the above embodiment, when the display unit 72 of the terminal device 7 displays the video gallery display screen, the outermost display images are displayed by the display unit 72 in a manner such that part of each image is cut by the outer periphery of the display range of the display unit 72, as the information which indicates that there are display images outside the display range and the display range is movable. However, another manner may be employed. For example, the video gallery display screen generation unit 516 of the video distribution device 5 generates a video gallery display screen in which information which indicates that the display range is movable is also displayed in addition to the display range on the video gallery display screen.

Figure 17:
FIG. 17 is a diagram showing another example of the video gallery display screen displayed by the display unit of the terminal device in the embodiment.

FIG. 17 is a diagram which shows another display example of the video gallery display screen displayed by the display unit 72 of the terminal device 7. The gallery display control unit 751 changes the color of the outer periphery of the display range determined in step S215 in FIG. 5, which is displayed by the display unit 72.

Figure 18:
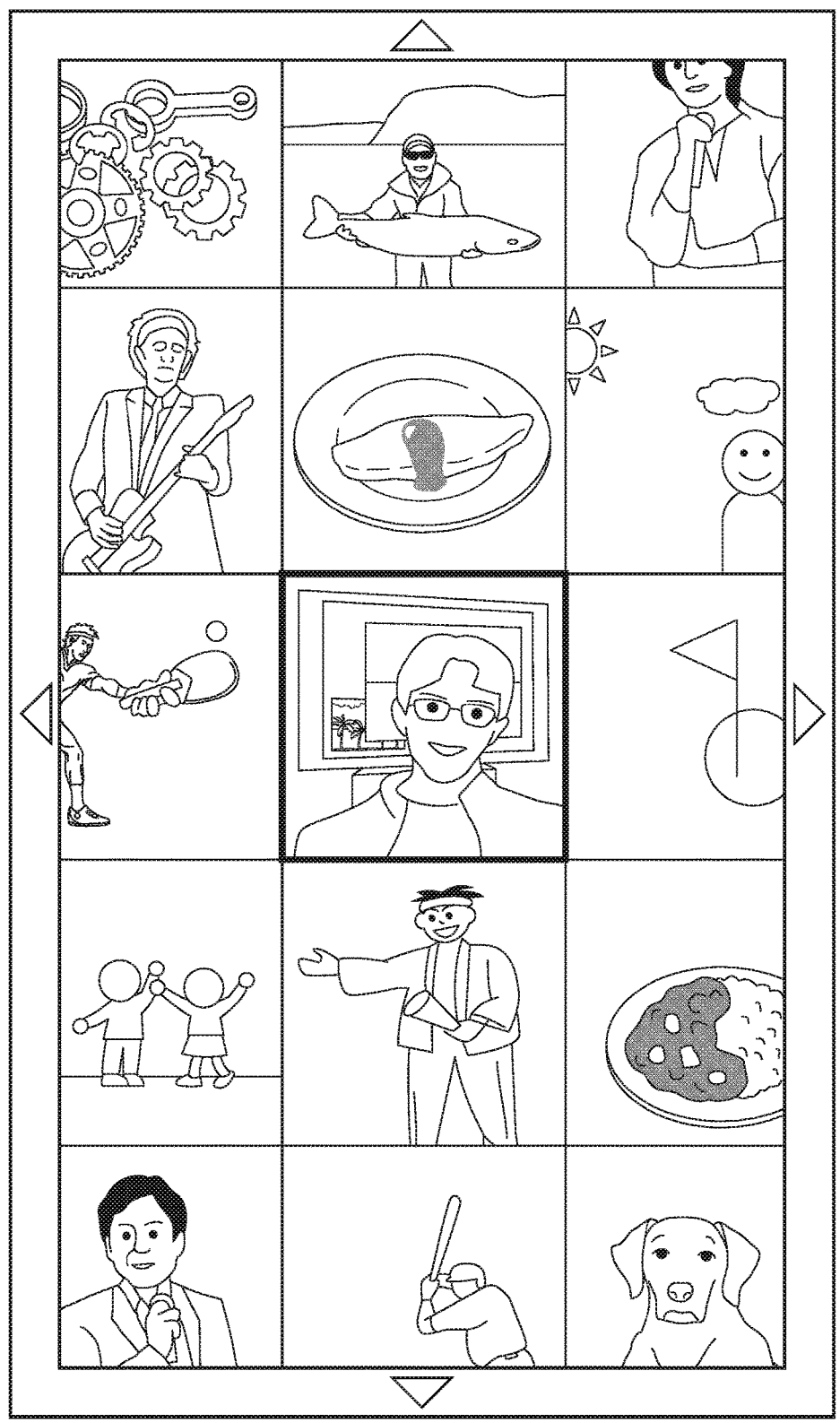
FIG. 18 is a diagram showing another example of the video gallery display screen displayed by the display unit of the terminal device in the embodiment.

FIG. 18 is also a diagram which shows another display example of the video gallery display screen displayed by the display unit 72 of the terminal device 7. As shown in FIG. 18, the gallery display control unit 751 displays arrows on the upper, lower, right, and left sides of the display range determined in step S215 in FIG. 5, where such arrows may be displayed within the display range.

According to the above-explained embodiment, the user selects the video to be watched while moving the display range of the video gallery formed in a tiling manner. When the user watches the selected video, other videos may be partially displayed on both sides of the selected video in a selectable manner, that is, information which indicates that another video data item can be selected and displayed as a new display target. Therefore, it is possible to make the user be conscious that there are videos other than those included in the video gallery currently displayed by the terminal device or the video as the display target, by which paths to other videos can be secured. Therefore, it is possible to give the user an opportunity of selecting a greater number of videos. Furthermore, the user can easily find and watch a desired video while enjoying the finding operation.

The video distribution device 5 and the terminal device 7 each include a computer system. The steps in each operation of the video distribution device 5 and the terminal device 7 are stored as a program in a computer-readable storage medium, and the operation is performed when the relevant computer loads and executes the program. The above computer system includes hardware resources such as a CPU, various types of memories, an OS, and peripheral devices. The computer system includes a WWW system provided with a homepage service (or viewable) environment. The above computer readable storage medium is a storage device, for example, a portable medium such as a flexible disk, a magneto optical disk, a ROM, or a CD-ROM, or a memory device such as a hard disk built in a computer system. The computer readable storage medium also includes a device for temporarily storing the program, such as a volatile memory (RAM) in a computer system which functions as a server or client and receives the program via a network (e.g., the Internet) or a communication line (e.g., a telephone line).

The above program, stored in a memory device or the like of a computer system, may be transmitted via a transmission medium or by using transmitted waves passing through a transmission medium to another computer system. The transmission medium for transmitting the program has a function of transmitting data, and is, for example, a (communication) network such as the Internet or a communication line such (e.g., a telephone line). In addition, the program may execute a part of the above-explained functions. The program may also be provided as a "differential" file ("differential" program) so that the above-described functions can be executed by a combination program of the differential program and an existing program which has already been stored in the relevant computer system.

While an embodiment of the present invention has been explained in detail with reference to the drawings, specific structures are not limited to the embodiment. Design modifications or the like can be made without departing from the scope of the present invention.

REFERENCE SYMBOLS

1 video distribution system
3 video posting device
5 video distribution device
7 terminal device
9 network
51 video distribution processing unit
53 comment distribution processing unit
71 communication unit (reception unit)
72 display unit
73 operation acceptance unit
74 sound output unit
75 control unit
511 storage unit
512 arrangement determination unit
513 video reception unit
514 gallery display video generation unit
515 transmission range determination unit
516 video gallery display screen generation unit
517 display position receiving unit
518 sound distribution unit
519 video display screen generation unit
531 comment reception unit
532 comment storage unit
533 comment distribution unit
751 gallery display control unit
752 sound control unit
753 video display control unit (video redisplay control unit)
754 comment processing unit

The invention claimed is:
1. A video distribution device comprising:
   a transmission range determinator that receives information, indicating a display position for a video gallery display screen from a terminal device, the transmission range determinator determining, as a transmission range for video gallery data in which display images of video data items are arranged, a range at approximately a center of which the display position indicated by the received information is positioned and which has a size greater than a possible display range of the terminal device; and
   a video gallery display screen generator that generates the video gallery display screen in which the display images of the video data items included in the transmission range determined by the transmission range determinator are arranged according to an arrangement of the display images of the video data items which is defined by the video gallery data, wherein the video gallery display screen generator distributes the generated video gallery display screen to the terminal device;

wherein among the display images of the video data items in the video gallery display screen, an outermost image included in the display range of the terminal device in the video gallery display screen is displayed in a manner such that part of the outermost image is cut by an outer periphery of the display range; and in the video gallery display screen, the display images of the video data items have the same size and are arranged in a vertical direction and a horizontal direction.

2. The video distribution device in accordance with claim 1, wherein:

in the video gallery display screen, information which indicates that the display range is movable is additionally displayed for the display range of the terminal device.

3. The video distribution device in accordance with claim 1, wherein:

if the video gallery display screen generator has not received a video data item whose display image is to be displayed in the transmission range, the video gallery display screen generator generates the video gallery display screen in which a display image of other content data associated with the relevant video data is arranged instead of the display image thereof.

4. The video distribution device in accordance with claim 1, further comprising:

a display position receiver that receives, from the terminal device, information utilized to identify video data item whose display image is shown at a predetermined display position; and a sound distributor that distributes sound data of the video data item identified by the information received by the display position receiver.

5. The video distribution device in accordance with claim 1, further comprising:

a display position receiver that receives, from the terminal device, information utilized to identify video data item whose display image is shown at a predetermined display position; and a sound distributor that superimposes sound data of the video data item identified by the information received by the display position receiver on sound data of another video data item whose display image is arranged in a predetermined range measured from the display image of the identified video data item in the video gallery data, where the volume of each sound data item is determined according to the arrangement of the corresponding display image in the video gallery data.

6. The video distribution device in accordance with claim 1, wherein:

the display images of the video data items arranged in the video gallery display screen are reduced display images or trimmed display images of the video data items.

7. The video distribution device in accordance with claim 1, further comprising:

a video display screen generator that receives a display request of a video data item from the terminal device and generates a video display screen in which:

the size of the image of the video data item as a display target indicated by the received display request is greater than the size of each display image on the video gallery display screen; and information which indicates that another video data item is selectable as the display target is displayed, wherein the video display screen generator distributes the generated video display screen to the terminal device.

8. The video distribution device in accordance with claim 7, wherein:

the information which indicates that another video data item is selectable as the display target is part or the whole of an image of said another video data item.

9. The video distribution device in accordance with claim 8, wherein:

in the video display screen, in addition to the image of the video data item as the display target having a size greater than that of each display image in the video gallery display screen, an image of said another video data item which is selectable as the display target is displayed adjacent to the video data item as the display target in a manner such that part of the image of said another video data item is cut by an outer periphery of the video display screen.

10. The video distribution device in accordance with claim 8, wherein:

the video display screen generator changes said another video data item, part of which is displayed on the video display screen, at regular time intervals.

11. The video distribution device in accordance with claim 7, wherein:

in the video gallery data, a display image of said another video data item which is selectable as the display target is arranged adjacent to the image of the video data as the display target.

12. The video distribution device in accordance with claim 7, further comprising:

a comment receptor that receives comment information for the video data item as the display target on the video display screen from the terminal device to which the video display screen generator distributes the video display screen; and a comment distributor that distributes the comment information, which was received by the comment receptor for the video data item as the display target on the video display screen, to the terminal device to which the video display screen generator distributes the video display screen.

13. The video distribution device in accordance with claim 7, wherein:

in the video display screen, said information which indicates that another video data item is selectable as the display target is displayed on left and right sides or upper and lower sides of the image of the video data item as the display target.

14. A non-transitory computer readable recording medium storing a program that makes a computer function as the transmission range determinator and the video gallery display screen generator of the video distribution device in accordance with claim 1.

15. A video distribution method executed by a video distribution device, the method comprising:

receiving information, indicating a display position for a video gallery display screen from a terminal device;

determining, as a transmission range for video gallery data in which display images of video data items are arranged, a range at approximately a center of which the display position indicated by the received information is positioned and which has a size greater than a possible display range of the terminal device;

generating the video gallery display screen in which the display images of the video data items included in the determined transmission range are arranged according to an arrangement of the display images of the video data items which is defined by the video gallery data; and distributing the generated video gallery display screen to the terminal device;

wherein among the display images of the video data items in the video gallery display screen, an outermost image included in the display range of the terminal device in the video gallery display screen is displayed in a manner such that part of the outermost image is cut by an outer periphery of the display range; and in the video gallery display screen, the display images of the video data items have the same size and are arranged in a vertical direction and a horizontal direction.

* * * * *